US 11,623,677 B2

(12) United States Patent
Kurokawa et al.

(10) Patent No.: US 11,623,677 B2
(45) Date of Patent: Apr. 11, 2023

(54) ELECTRIC STEERING DEVICE

(71) Applicant: NSK LTD., Tokyo (JP)

(72) Inventors: Yoshifumi Kurokawa, Ann Arbor, MI (US); Victor Corona Martinez, Ann Arbor, MI (US)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/331,352

(22) Filed: May 26, 2021

(65) Prior Publication Data

US 2021/0394813 A1 Dec. 23, 2021

Related U.S. Application Data

(60) Provisional application No. 63/031,100, filed on May 28, 2020.

(51) Int. Cl.
*B62D 1/181* (2006.01)
*B62D 1/189* (2006.01)

(52) U.S. Cl.
CPC .............. *B62D 1/181* (2013.01); *B62D 1/189* (2013.01)

(58) Field of Classification Search
CPC ......... B62D 1/181; B62D 1/187; B62D 1/189
See application file for complete search history.

(56) References Cited

U.S. PATENT DOCUMENTS

| | | | |
|---|---|---|---|
| 7,258,365 B2 * | 8/2007 | Kahlenberg | B62D 1/192 |
| | | | 280/775 |
| 10,023,223 B2 * | 7/2018 | Anspaugh | B62D 1/195 |
| 2008/0087130 A1 * | 4/2008 | Beneker | B62D 1/181 |
| | | | 74/493 |
| 2013/0098193 A1 * | 4/2013 | Morinaga | B62D 1/181 |
| | | | 74/493 |
| 2017/0057535 A1 * | 3/2017 | Vermeersch | B62D 1/185 |
| 2018/0141581 A1 * | 5/2018 | Kato | F16H 1/203 |
| 2019/0061803 A1 | 2/2019 | Inoue et al. | |
| 2021/0229733 A1 * | 7/2021 | Kurokawa | B62D 1/184 |
| 2021/0339790 A1 * | 11/2021 | Kurokawa | B62D 1/185 |
| 2021/0394815 A1 * | 12/2021 | Ohrui | B62D 1/181 |

FOREIGN PATENT DOCUMENTS

| | | | | |
|---|---|---|---|---|
| DE | 19962494 A1 | * | 7/2000 | ............ B62D 1/181 |
| DE | 202016008693 U1 | * | 3/2019 | ............ B62D 1/184 |
| DE | 102020205728 A1 | * | 11/2021 | |
| EP | 2055611 A1 | * | 5/2009 | ............ B62D 1/181 |
| EP | 2572959 A1 | * | 3/2013 | ............ B62D 1/181 |
| EP | 3162655 A1 | * | 5/2017 | ............ B62D 1/181 |
| JP | 2009096408 A | * | 5/2009 | |

(Continued)

*Primary Examiner* — Nicole T Verley
(74) *Attorney, Agent, or Firm* — Sughrue Mion, PLLC

(57) ABSTRACT

An electrically adjustable steering device includes a top bracket fixed to a vehicle body, a steering shaft to which a steering wheel is connected, a steering jacket which is held by the top bracket and rotatably supports the steering shaft inside, a tilt actuator which adjusts a tilt of the steering jacket, and a link member which is pivotably supported by the top bracket, the steering jacket, and the tilt actuator. The tilt of the steering jacket can be adjusted by transmitting power of the tilt actuator to the steering jacket via the link member. The link member is placed only on one side of the steering jacket in a vehicle left-right direction.

13 Claims, 31 Drawing Sheets

(56) References Cited

FOREIGN PATENT DOCUMENTS

| JP | 2016187973 A | * | 11/2016 | | |
|---|---|---|---|---|---|
| JP | 6183698 B2 | * | 8/2017 | | |
| JP | 2019-38439 A | | 3/2019 | | |
| JP | 2021183454 A | * | 12/2021 | | |
| WO | WO-2013118412 A1 | * | 8/2013 | ............ | B62D 1/181 |
| WO | WO-2021099606 A1 | * | 5/2021 | ............ | B62D 1/181 |

* cited by examiner

ELECTRIC STEERING DEVICE

CROSS-REFERENCE TO RELATED APPLICATIONS

This application is based on U.S. Provisional Patent Application 63/031,100 filed May 28, 2020, the contents of which are incorporated herein by reference.

TECHNICAL FIELD

The present invention relates to an electrically adjustable steering device.

BACKGROUND ART

In a related art, an electrically adjustable steering device is known which includes a steering wheel, a steering shaft, a steering jacket, an intermediate shaft which connects the steering shaft and a steering gear unit via a pair of universal joints, the steering gear unit, a pair of tie rods, a telescopic mechanism, and a tilt mechanism. For example, an electric steering column device of JP-A-2019-38439 includes a vehicle mounting bracket, a steering column swingably supported by the vehicle mounting bracket, and a tilt mechanism using an electric motor as a drive source. The tilt mechanism has a link member which connects the vehicle mounting bracket and the steering column.

Patent Literature 1: JP-A-2019-38439

SUMMARY OF INVENTION

In the electric steering column device disclosed in JP-A-2019-38439, a link member integrally includes a pair of body portions provided on left and right sides of the steering column and a connection portion which connects the pair of body portions to each other. The link member is U-shaped so as to surround the steering column. Since the link member is placed in three directions around the steering column in this way, other members cannot be placed in a vicinity of an outer periphery of the steering column and the entire electric steering column device becomes large in a radial direction.

FIG. 27 is an electrically adjustable steering device 100 according to a first example of the related art. The electrically adjustable steering device 100 includes a top bracket 103 which holds a steering jacket 120, which will be described below, a steering shaft 110 to which a steering wheel 101 is connected and which is rotated by the steering wheel 101, a steering jacket 120 which rotatably supports the steering shaft 110 inside, a telescopic actuator 130 which adjusts a front-rear position of the steering wheel 101, that is, a length of the steering shaft 110 and the steering jacket 120, and a tilt actuator 150 which adjusts an up-down position of the steering wheel 101, that is, an inclination of the steering shaft 110 and the steering jacket 120.

The steering jacket 120 is provided with a first jacket member 121 and a second jacket member 122 in this order from the steering wheel 101 side (vehicle rear side; the right side in FIG. 27) around the steering shaft 110. The first and second jacket members 121 and 122 overlap each other so that the steering jacket 120 can be expanded and contracted in an axial direction.

An outer diameter of the first jacket member 121 is smaller than an inner diameter of the second jacket member 122. Therefore, the first jacket member 121 is expandably and contractibly accommodated inside the second jacket member 122 in a radial direction.

A vehicle front side part of the second jacket member 122 is pivotably connected to a front support portion 103a of the top bracket 103 by a pivot P0. The top bracket 103 in this example includes a base portion 103d which is placed above the second jacket member 122 and extends in the axial direction and a front support portion 103a, a rear support portion 103b, and a rear end support portion 103c which extend respectively downward from the base portion 103d. A pair of front support portions 103a, rear support portions 103b, and rear end support portions 103c are provided on vehicle left and right sides of the second jacket member 122, but only one of them is illustrated in FIG. 27. The pair of front support portions 103a support a front part of the second jacket member 122 and the pair of rear support portions 103b support a rear part of the second jacket member 122, and further the pair of rear end support portions 103c support a rear end part of the second jacket member 122.

The first jacket member 121 pivotably supports the steering shaft 110 with a built-in bearing (not illustrated). Further, the second jacket member 122 pivotably supports the steering shaft 110 by a built-in bearing (not illustrated). That is, the steering jacket 120 pivotably supports the steering shaft 110 by an internally fitted bearing.

A universal joint 161 is provided in a front end portion of the steering shaft 110 so that the steering shaft 110 can be bent smoothly when tilted. Therefore, the steering shaft 110 is connected to a pinion shaft of the steering gear unit via a pair of universal joints 161 (only one is illustrated) and an intermediate shaft 116. As a result, by rotating the steering wheel 101, the pinion shaft is rotated via the steering shaft 110. The rotation of the pinion shaft is converted into a linear motion of the rack shaft by the steering gear unit. As a result, a pair of tie rods are pushed and pulled, and thus a pair of steered wheels are given a steering angle according to an amount of operation of the steering wheel 101.

The telescopic actuator 130 is placed between the second jacket member 122 and the first jacket member 121. The telescopic actuator 130 is a screw shaft rotary actuator and includes a screw shaft 134, a motor 133 which rotationally drives the screw shaft 134, and a nut 135 which is a driven portion and which is screwed onto the screw shaft 134.

The motor 133 of the telescopic actuator 130 is fixed to a front support portion 121a of the first jacket member 121 via a pivot P1. The front support portion 121a of the first jacket member 121 protrudes radially outward from an outer peripheral surface of the first jacket member 121 and a through hole (not illustrated) for passing the front support portion 121a is formed in the second jacket member 122. A front end portion of the screw shaft 134 is connected to the motor 133 and a rear end portion of the screw shaft 134 is rotatably supported by the rear support portion 121b of the first jacket member 121.

Then, the motor 133 of the telescopic actuator 130 is driven to rotate the screw shaft 134, so that the first jacket member 121 moves in the axial direction and is pulled into and accommodated in the second jacket member 122. In this case, the steering shaft 110 is also accommodated in the second jacket member 122.

The tilt actuator 150 includes a screw shaft 152, a tilt motor 151 which rotationally drives the screw shaft 152, and a nut 153 which is a driven portion and which is screwed onto the screw shaft 152. The tilt motor 151 is pivotably supported at an axial intermediate portion of the second jacket member 122 by a pivot P2. The nut 153 is pivotably connected to the link member 155 by a pivot P3.

Here, FIG. 28 illustrates a cross-sectional arrow view taken along the line A-A in FIG. 27. In FIG. 28, the motor 133 placed below the link member 155 is not shown. As illustrated in FIG. 28, the top bracket 103 has a pair of rear support portions 103b and 103b protruding downward from the base portion 103d and pinching the second jacket member 122 from both the left and right sides. The link member 155 includes a pair of body portions 155a and 155a placed on both the left and right sides of the pair of rear support portions 103b and 103b and extending below the second jacket member 122 and a connection portion 155b which connects lower end portions of the pair of body portions 155a and 155a. As described above, the link member 155 has a substantially U-shaped cross section so as to straddle the second jacket member 122 below. Further, as illustrated in FIG. 27, a pivot portion 155c extending to a vehicle rear part is formed at an upper end portion of the body portion 155a.

The link member 155 is pivotably supported at a vehicle rear portion of the second jacket member 122 by a pivot P4 provided in the pivot portion 155c. Further, the link member 155 is fixed to the rear support portion 103b of the top bracket 103 by a pivot P5 provided in an upper end portion of the body portion 155a.

Then, by driving the tilt motor 151 to rotate the screw shaft 152, the nut 153 screwed onto the screw shaft 152 is moved. As a result, the link member 155 pivots around the pivot P5. The pivoting of the link member 155 is transmitted to the second jacket member 122 and the steering jacket 120, the steering shaft 110, and the steering wheel 101 pivot around the pivot P0. In this way, an up-down position of the steering wheel 101 is adjusted (tilted).

As described above, the link member 155 has a substantially U-shaped cross section so as to straddle the second jacket member 122 below. Therefore, the telescopic actuator 130 (motor 133 of the telescopic actuator 130 in this example) needs to be placed below the link member 155 so as not to interfere with the link member 155. In this case, a distance L from a rotation center O of the steering shaft 110 to an outer diameter portion of the telescopic actuator 130 becomes large, and thus the entire electrically adjustable steering device 100 becomes large in the radial direction.

FIG. 29 illustrates an electrically adjustable steering device 100 according to a second example of the related art. FIG. 30 is a cross-sectional arrow view taken along the line B-B in FIG. 29 and FIG. 31 is a cross-sectional arrow view taken along the line C-C in FIG. 29. In an example of FIG. 27, the link member 155 has a shape which straddles a lower part of the second jacket member 122, but in an example of FIG. 29, the link member 155 has a shape which straddles an upper part of the second jacket member 122.

In this example, a pair of body portions 155a and 155a of the link member 155 extend above the second jacket member 122. Pivot portions 155c extending to a vehicle rear side are respectively formed at upper end portions of the pair of body portions 155a and 155a. An outer peripheral surface of the second jacket member 122 has a convex portion 122a protruding upward and placed between a pair of pivot portions 155c and 155c. The pair of pivot portions 155c and 155c are connected by a shaft portion 155d which penetrates the convex portion 122a of the second jacket member 122 in a vehicle left-right direction.

As described above, also in this example, the link member 155 is shaped so as to straddle the second jacket member 122 above. Therefore, the top bracket 103 needs to be placed below the link member 155 so as not to interfere with the link member 155. In this case, a distance L1 from a rotation center O of the steering shaft 110 to an outer diameter portion of the top bracket 103 becomes large, and thus the entire electrically adjustable steering device 100 becomes large in the radial direction. As described above, the electrically adjustable steering device of the example of the related art has layout restrictions.

The present invention is made in view of the problems described above and an object of the present invention is to provide an electrically adjustable steering device capable of miniaturization.

The object described above of the present invention is achieved by the following configuration.

(1) An electrically adjustable steering device, including:
a top bracket fixed to a vehicle body;
a steering shaft to which a steering wheel is connected;
a steering jacket which is held by the top bracket and rotatably supports the steering shaft inside;
a tilt actuator which adjusts a tilt of the steering jacket; and
a link member which is pivotably supported by the top bracket, the steering jacket, and the tilt actuator, where
the tilt of the steering jacket can be adjusted by transmitting power of the tilt actuator to the steering jacket via the link member, and
the link member is placed only on one side of the steering jacket in a vehicle left-right direction.

(2) The electrically adjustable steering device according to (1), where
the steering jacket includes a pair of pads protruding in the vehicle left-right direction, and
the top bracket includes a pair of support portions which slidably pinch the pair of pads from an outside in the vehicle left-right direction.

(3) The electrically adjustable steering device according to (1), where
the link member is pivotably fixed to the tilt actuator by a first pivot, pivotably fixed to the steering jacket or the top bracket by a second pivot, and pivotably fixed to the top bracket or the steering jacket by a third pivot, and
the first to third pivots are disposed on a same plane.

(4) The electrically adjustable steering device according to (3), where
the tilt actuator includes a screw shaft, a tilt motor which rotationally drives the screw shaft, and a nut which is screwed onto the screw shaft,
the link member includes a body portion extending in a vehicle up-down direction and a pivot portion extending in an axial direction from the body portion,
the body portion includes a first part which supports the nut from the vehicle left-right direction and is fixed to the nut by the first pivot and a second part fixed to the top bracket or the steering jacket by the third pivot,
the pivot portion is fixed to the steering jacket or the top bracket by the second pivot, and
the second pivot and the third pivot are disposed inside the first pivot in the vehicle left-right direction.

(5) The electrically adjustable steering device according to (4), where
a part of the link member, which is the part provided with the second pivot and the third pivot, has a substantially flat plate shape.

(6) The electrically adjustable steering device according to (3), where
the tilt actuator is pivotably fixed to the steering jacket or the top bracket by a fourth pivot, and
the first to fourth pivots are disposed on the same plane,
(7) The electrically adjustable steering device according to (3), where the link member includes a body portion extending in the up-down direction and a pivot portion extending in an axial direction from the body portion, the steering jacket includes a pair of protrusions which protrude to one side in the vehicle left-right direction and are separated from each other in the vehicle up-down direction, and the second pivot is configured by pivotably supporting the pivot portion of the link member between the pair of protrusions.

(8) The electrically adjustable steering device according to (7), where a bush which internally supports the pivot portion of the link member is placed between the pair of protrusions.

(9) The electrically adjustable steering device according to (8), where a wedge member is disposed between the bush and the protrusion.

(10) The electrically adjustable steering device according to (8), where an internal space for accommodating the pivot portion of the link member is formed inside the bush, and in the internal space, a cam member which applies a preload to the pivot portion is disposed around the pivot portion.

(11) The electrically adjustable steering device according to (8), where a cover is disposed between the bush and the pair of protrusions to prevent the bush and the pair of protrusions from directly sliding.

According to the invention, it is possible to provide an electrically adjustable steering device which can be miniaturized.

DESCRIPTION OF EMBODIMENTS

Hereinafter, each embodiment of an electrically adjustable steering device according to the present invention will be described in detail with reference to the drawings.

In addition, in this specification, "front", "rear", "left", "right", "up", and "down" respectively mean the front, the rear, the left, the right, the upper, and the lower part of an electrically adjustable steering device in a state where the electrically adjustable steering device is attached to a vehicle. Further, an "axial direction" means a direction along an axis of a steering shaft. A "telescopic operation" means an axial operation of a steering wheel. A "tilt operation" refers to an operation of the steering wheel in a direction perpendicular to the axis of the steering shaft.

First Embodiment

Figure 1:
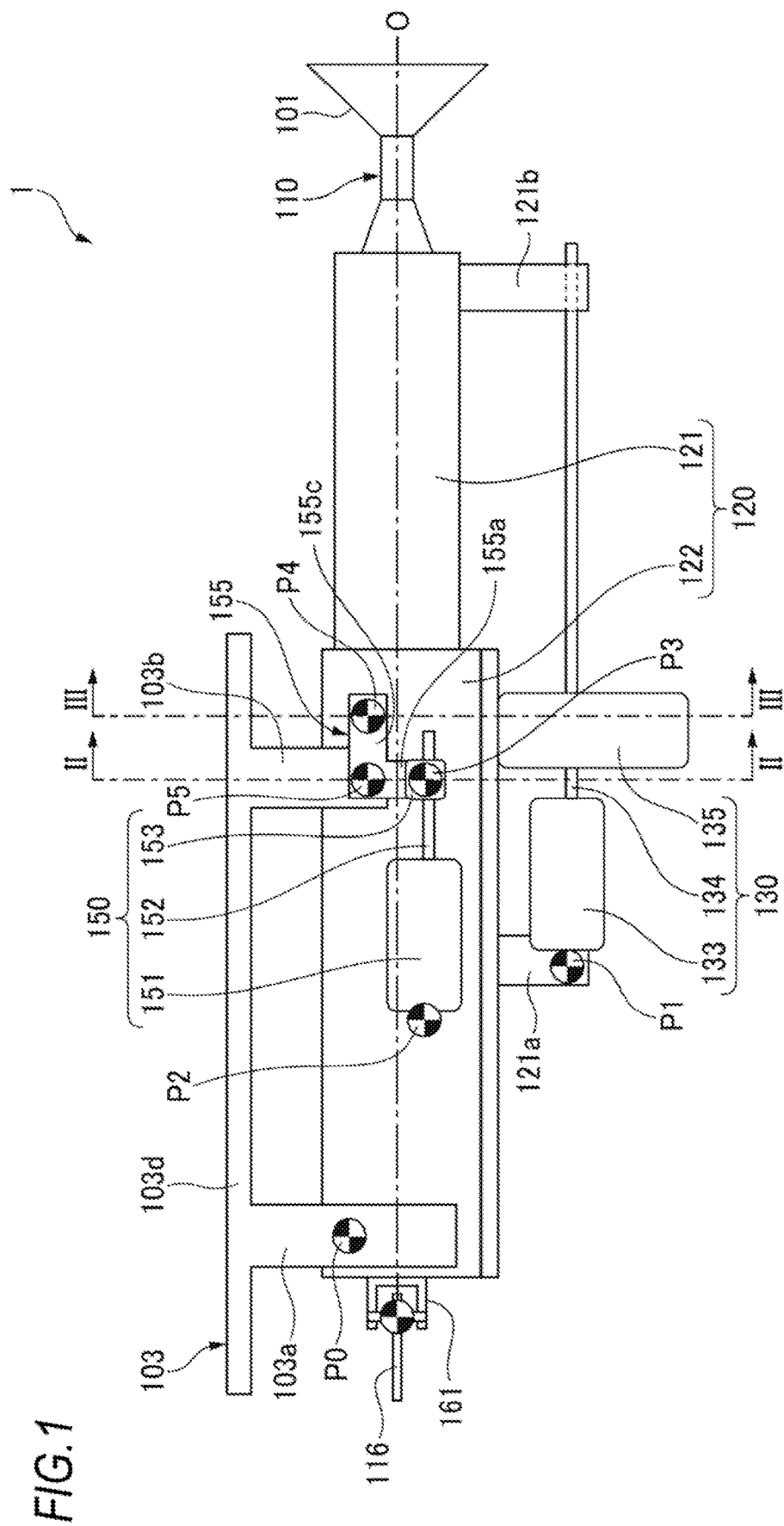
FIG. 1 is a schematic view of an electrically adjustable steering device of a first embodiment.
Figure 2:
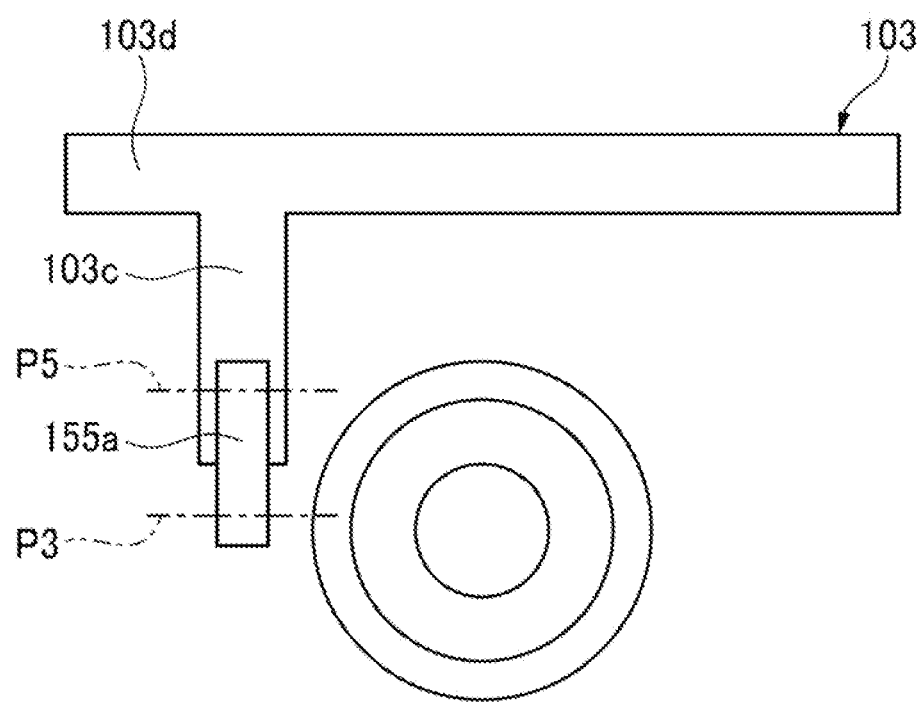
FIG. 2 is a cross-sectional arrow view taken along the line II-II of FIG. 1.
Figure 3:
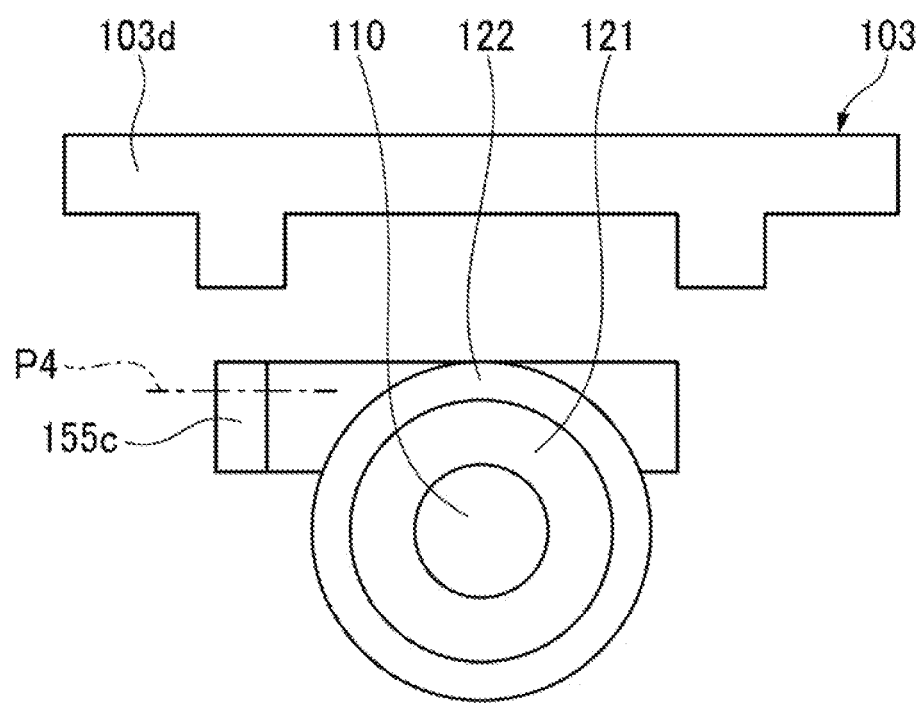
FIG. 3 is a cross-sectional arrow view taken along the line of FIG. 1.
Figure 4:
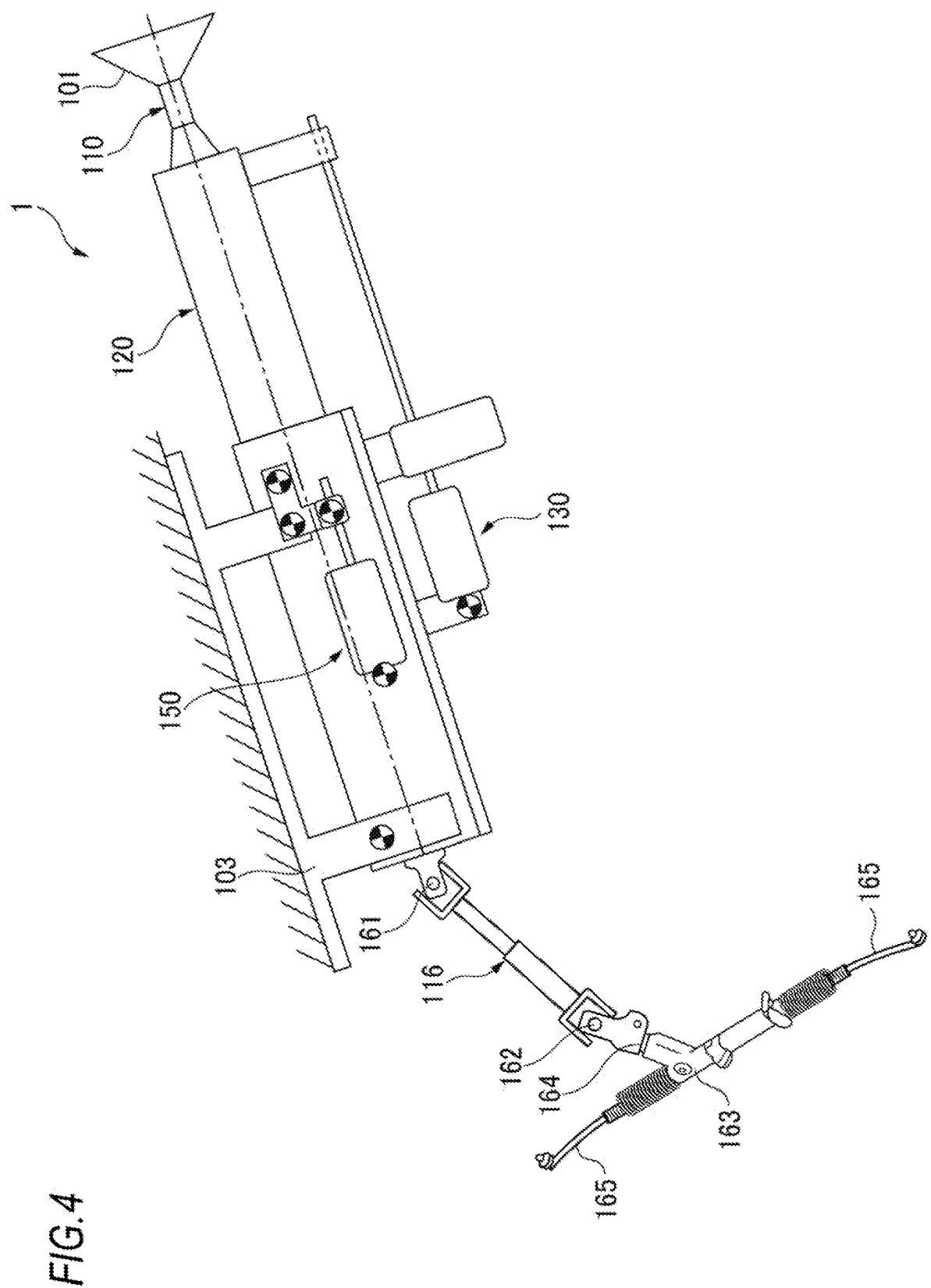
FIG. 4 is a schematic view of the electrically adjustable steering device.

FIG. 1 is a schematic view of an electrically adjustable steering device 1 of a first embodiment. FIG. 2 is a cross-sectional arrow view taken along the line II-II of FIG. 1 and FIG. 3 is a cross-sectional arrow view taken along the line of FIG. 1. FIG. 4 is a schematic view of the electrically adjustable steering device 1. In addition, in FIGS. 2 and 3, the illustration of a telescopic actuator 130 placed below a steering jacket 120 is omitted. The electrically adjustable steering device 1 includes a top bracket 103 which holds the steering jacket 120, which will be described below, and is fixed to a vehicle body, a steering shaft 110 to which a steering wheel 101 is connected and which is rotated by the steering wheel 101, a steering jacket 120 which rotatably supports the steering shaft 110 inside, a telescopic actuator 130 which adjusts a front-rear position of the steering wheel 101, that is, a length of the steering shaft 110 and the steering jacket 120, and a tilt actuator 150 which adjusts an up-down position of the steering wheel 101, that is, an inclination of the steering shaft 110 and the steering jacket 120.

The steering jacket 120 includes a first jacket member 121 and a second jacket member 122 in this order from the steering wheel 101 side (vehicle rear side; the right side in FIG. 1) around the steering shaft 110. The first and second jacket members 121 and 122 overlap each other so that the steering jacket 120 can be expanded and contracted in an axial direction.

An outer diameter of the first jacket member 121 is smaller than an inner diameter of the second jacket member 122. Therefore, the first jacket member 121 is expandably and contractibly accommodated in the second jacket member 122.

When the steering jacket 120 expands or contracts, it is preferable that the first jacket member 121 and the second jacket member 122 have a structure which cannot be mechanically separated. Specifically, the above-described structure is realized, for example, by a jacket shape such as an outward or inward protrusion forming a stopper between the jacket members 121 and 122, or by connecting a jacket member with a stopper provided in another component (for example, an actuator or an actuator nut) having a specified stroke.

In addition, to ensure sufficient bending rigidity of the steering jacket 120, regardless of the expansion and contraction of the steering jacket 120, it is preferable that the first jacket member 121 and the second jacket member 122 have, for example, an axially overlapping portion of at least 70 mm or more.

A vehicle front side part of the second jacket member 122 is pivotably connected to a front support portion 103a of the top bracket 103 by a pivot P0. The top bracket 103 of this example has a base portion 103d placed above the second jacket member 122 and extending in the axial direction and the front support portion 103a and a rear support portion 103b which are extending downward from the base portion 103d. A pair of front support portions 103a and rear support portions 103b are provided on the vehicle left and right sides of the second jacket member 122, but only one of them is illustrated in FIG. 1. The pair of front support portions 103a support a front part of the second jacket member 122 and the pair of rear support portions 103b support a rear part of the second jacket member 122.

The first jacket member 121 pivotably supports the steering shaft 110 with a built-in bearing (not illustrated). Further, the second jacket member 122 pivotably supports the steering shaft 110 by a built-in bearing (not illustrated). That is, the steering jacket 120 pivotably supports the steering shaft 110 by the internally fitted bearings.

A universal joint 161 is provided in a front end portion of the steering shaft 110 so that the steering shaft 110 can be bent smoothly when tilted. Therefore, as illustrated in FIG. 4, the steering shaft 110 is connected to a pinion shaft 164 of a steering gear unit 163 via a pair of universal joints 161, 162 and an intermediate shaft 116. As a result, by rotating the steering wheel 101, the pinion shaft 164 is rotated via the steering shaft 110. The rotation of the pinion shaft 164 is converted into a linear motion of a rack shaft by the steering gear unit 163, so that a pair of tie rods 165 are pushed and pulled. As a result, a pair of steered wheels are given a steering angle according to an amount of operation of the steering wheel 101.

As the universal joint 161, a universal joint, a flexible coupling, a rubber shaft joint, a block universal joint, a claw coupling, an elastic link coupling, or the like can be used.

The telescopic actuator 130 is placed between the second jacket member 122 and the first jacket member 121. The telescopic actuator 130 is a screw shaft rotary actuator and includes a screw shaft 134, a motor 133 which rotationally drives the screw shaft 134, and a nut 135 which is a driven portion and which is screwed onto the screw shaft 134. A reduction mechanism such as a worm and worm wheel mechanism may be provided between the motor 133 and the screw shaft 134.

The motor 133 of the telescopic actuator 130 is fixed to a front support portion 121a of the first jacket member 121 via a pivot P1. The front support portion 121a of the first jacket member 121 protrudes radially outward from an outer peripheral surface of the first jacket member 121 and the second jacket member 122 is formed with a through hole (not illustrated) for passing the front support portion 121a. A front end portion of the screw shaft 134 is connected to the motor 133 and a rear end portion of the screw shaft 134 is rotatably supported by a rear support portion 121b of the first jacket member 121.

Then, the motor 133 of the telescopic actuator 130 is driven to rotate the screw shaft 134, so that the first jacket member 121 moves in the axial direction and is pulled into and accommodated in the second jacket member 122. In this case, the steering shaft 110 is also accommodated in the second jacket member 122.

The tilt actuator 150 includes a screw shaft 152, a tilt motor 151 which rotationally drives the screw shaft 152, and a nut 153 which is a driven portion and which is screwed onto the screw shaft 152. The tilt motor 151 is pivotably supported at an axial intermediate portion of the second jacket member 122 by a pivot P2 as a fourth pivot. The nut 153 is pivotably connected to a link member 155 by a pivot P3.

The link member 155 is placed only on one side of the steering jacket 120 or the steering shaft 110 in a vehicle left-right direction, unlike the first and second examples of the related art illustrated in FIGS. 27 to 31. That is, an up-down width of the link member 155 is smaller than an up-down width of the steering jacket 120 (second jacket member 122 in this example), and thus the link member 155 does not protrude further in the up-down direction than the steering jacket 120 (second jacket member 122 in this example).

The link member 155 has a body portion 155a extending in the up-down direction and a pivot portion 155c extending in the axial direction from the body portion 155a.

The link member 155 is pivotably supported at a vehicle rear portion of the second jacket member 122 by a pivot P4 provided in the pivot portion 155c. Further, the link member 155 is pivotably fixed to the rear support portion 103b of the top bracket 103 by a pivot P5 provided in an upper end portion of the body portion 155a.

In this way, the link member 155 is pivotably fixed to the nut 153 of the tilt actuator 150 by the pivot P3 as the first pivot, and the link member 155 is pivotably fixed to the second jacket member 122 of the steering jacket 120 by the pivot P4 as the second pivot, and further the link member 155 is pivotably fixed to the top bracket 103 by the pivot P5 as the third pivot. Then, by transmitting power of the tilt actuator 150 to the steering jacket 120 via the link member 155, the steering jacket 120 can be tilted. More specifically, by driving the tilt motor 151 to rotate the screw shaft 152, the nut 153 screwed onto the screw shaft 152 is moved. As a result, the link member 155 pivots around the pivot P5. The pivoting of the link member 155 is transmitted to the second jacket member 122 and the steering jacket 120, the steering shaft 110, and the steering wheel 101 pivot around the pivot P0. In this way, the up-down position of the steering wheel 101 is adjusted (tilted).

As described above, since the link member 155 is placed only on one side of the steering jacket 120 in the vehicle left-right direction, the link member 155 does not protrude in the up-down direction of the steering jacket 120. Therefore, the degree of freedom in the layout of the electrically adjustable steering device 1 is improved, and for example, the telescopic actuator 130 can be placed in the lower vicinity of the steering jacket 120 as shown in the illustrated example. As described above, in this example, the electrically adjustable steering device 1 can be miniaturized.

Second Embodiment

Figure 5:
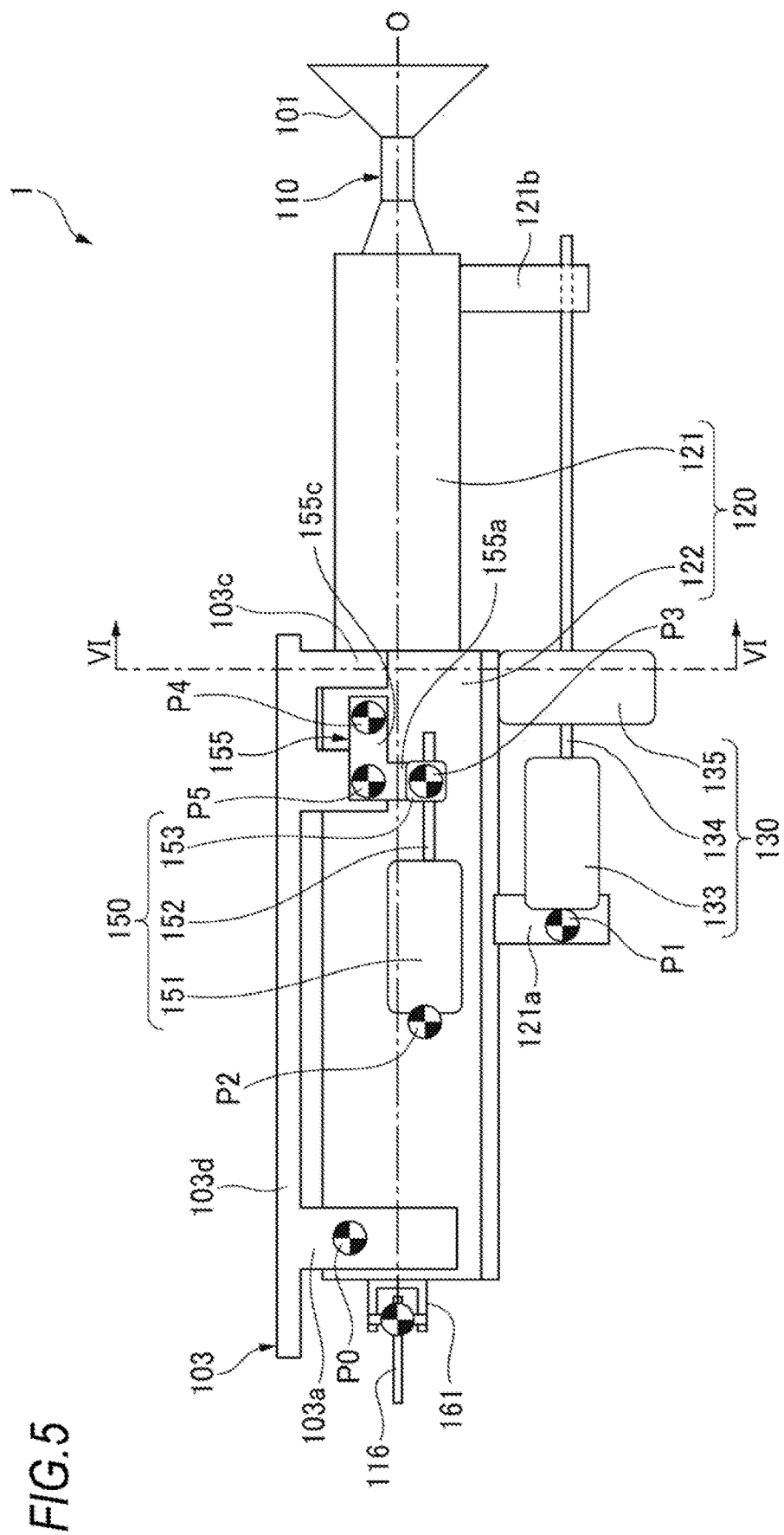
FIG. 5 is a schematic view of an electrically adjustable steering device of a second embodiment.
Figure 6:
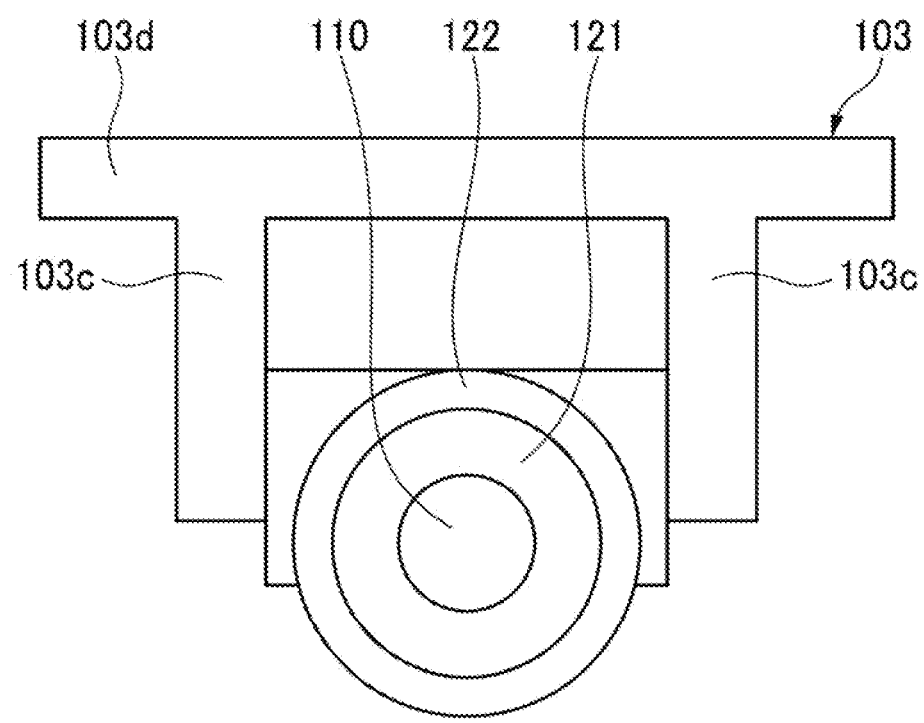
FIG. 6 is a cross-sectional arrow view taken along the line VI-VI of FIG. 5.

FIG. 5 is a schematic view of an electrically adjustable steering device 1 of a second embodiment. FIG. 6 is a cross-sectional arrow view taken along the line VI-VI of FIG. 5. The second embodiment is different from the first embodiment in that the top bracket 103 includes a rear end support portion 103*c*. Since the other configurations of the second embodiment are substantially the same as the configurations of the first embodiment, the description thereof will be omitted by adding reference numerals to the drawings.

The top bracket 103 of the present embodiment includes a base portion 103*d* which is placed above the second jacket member 122 and extends in the axial direction and the front support portion 103 a, the rear support portion 103*b*, and the rear end support portion 103*c* which extend downward from base portion 103*d*. A pair of front support portions 103*a*, rear support portions 103*b*, and rear end support portions 103*c* are provided on the vehicle left and right sides of the second jacket member 122, but only one of them is illustrated in FIG. 5. The pair of front support portions 103*a* support a front part of the second jacket member 122, and the pair of rear support portion 103*b* support a rear part of the second jacket member 122, and further the pair of rear end support portions 103*c* support a rear end part of the second jacket member 122.

In particular, as illustrated in FIG. 6, the pair of rear end support portions 103*c* are in contact with the second jacket member 122 so as to pinch the second jacket member 122 from both the left and right sides. As a result, the rigidity of the electrically adjustable steering device 1 is increased.

Third Embodiment

Figure 7:
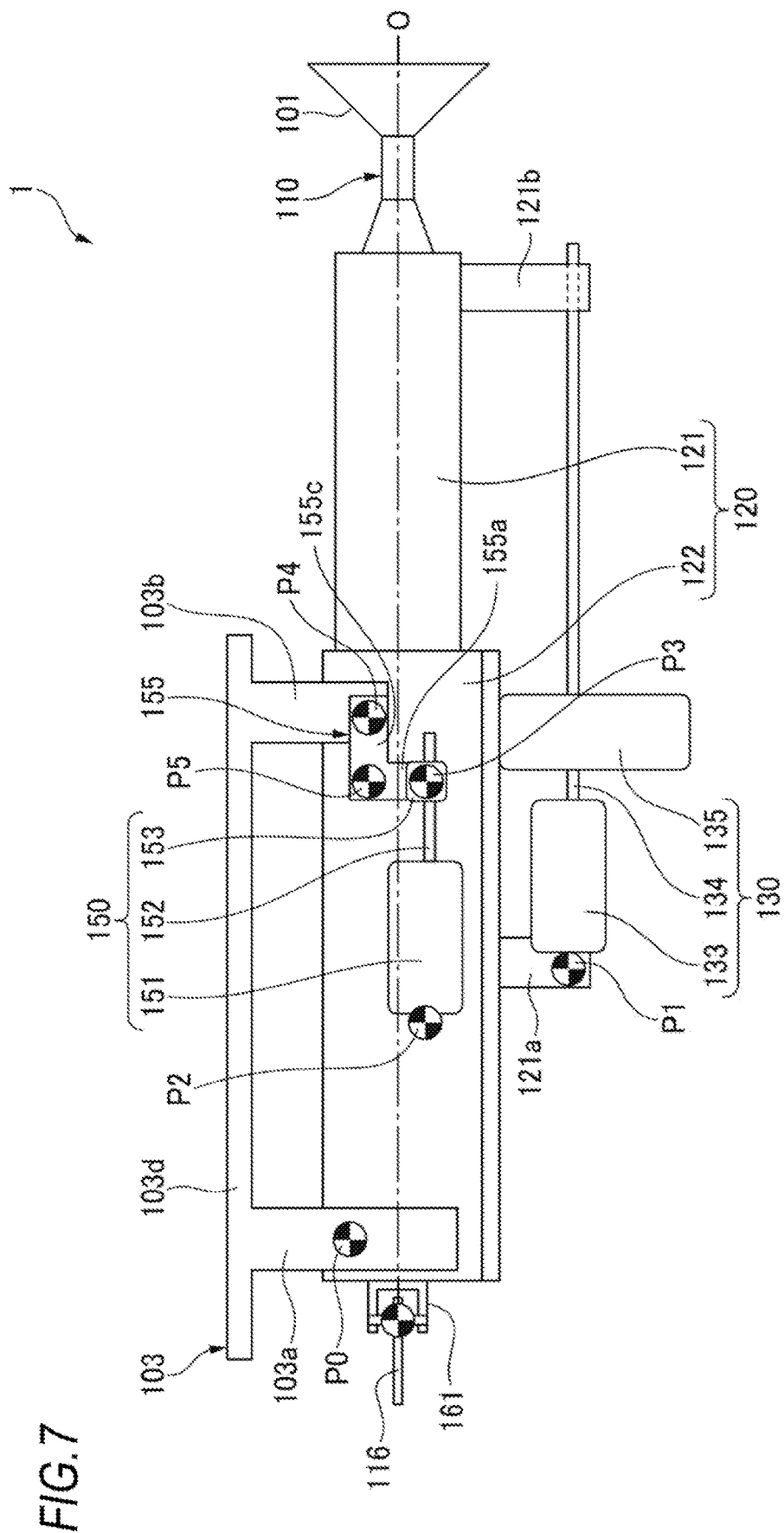
FIG. 7 is a schematic view of an electrically adjustable steering device according to a third embodiment.

FIG. 7 is a schematic view of an electrically adjustable steering device 1 of a third embodiment. In the third embodiment, the fixed positions of the pivots P4 and P5 are different from those in the first embodiment (see FIG. 1). Since the other configurations of the third embodiment are substantially the same as the configurations of the first embodiment, the description thereof will be omitted by adding reference numerals to the drawings.

The link member 155 of the present embodiment is supported at the rear support portion 103*b* of the top bracket 103 by the pivot P4 provided in the pivot portion 155*c*. Further, the link member 155 is fixed to the second jacket member 122 by the pivot P5 provided in an upper end portion of the body portion 155*a*.

Then, by driving the tilt motor 151 to rotate the screw shaft 152, the nut 153 screwed onto the screw shaft 152 is moved. As a result, the link member 155 pivots around the pivot P5. The pivoting of the link member 155 is transmitted to the second jacket member 122 and the steering jacket 120, the steering shaft 110, and the steering wheel 101 pivot around the pivot P0. In this way, the up-down position of the steering wheel 101 is adjusted (tilted).

Even with the above-described present embodiment, it is possible to obtain the same effect as that of the first embodiment.

Fourth Embodiment

Figure 8:
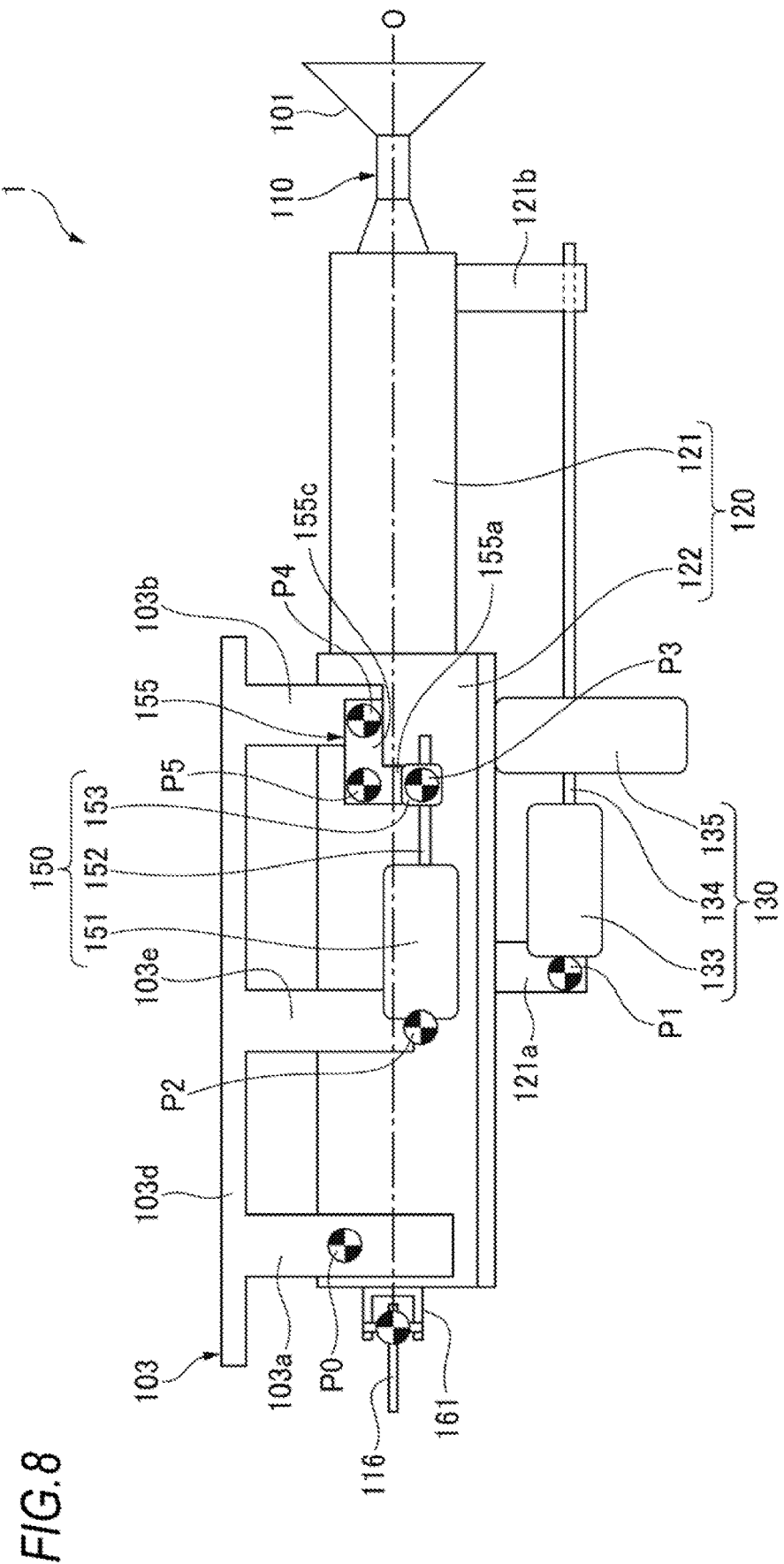
FIG. 8 is a schematic view of an electrically adjustable steering device according to a fourth embodiment.

FIG. 8 is a schematic view of an electrically adjustable steering device 1 of a fourth embodiment. The fourth embodiment is different from the third embodiment (see FIG. 7) in that the tilt motor 151 is fixed to an intermediate support portion 103*e* of the top bracket. Since the other configurations of the fourth embodiment are substantially the same as the configurations of the third embodiment, the description thereof will be omitted by adding reference numerals to the drawings.

The top bracket 103 of the present embodiment includes the intermediate support portion 103*e* extending downward from the base portion 103*d* and placed between the front support portion 103*a* and the rear support portion 103*b*. The tilt motor 151 is supported at the intermediate support portion 103*e* by the pivot P1. Since the tilt motor 151, which is a heavy object, is supported by the top bracket 103, the natural frequency of the steering jacket 120 can be increased as compared with the case where the tilt motor 151 is fixed to the steering jacket 120.

Fifth Embodiment

Figure 9:
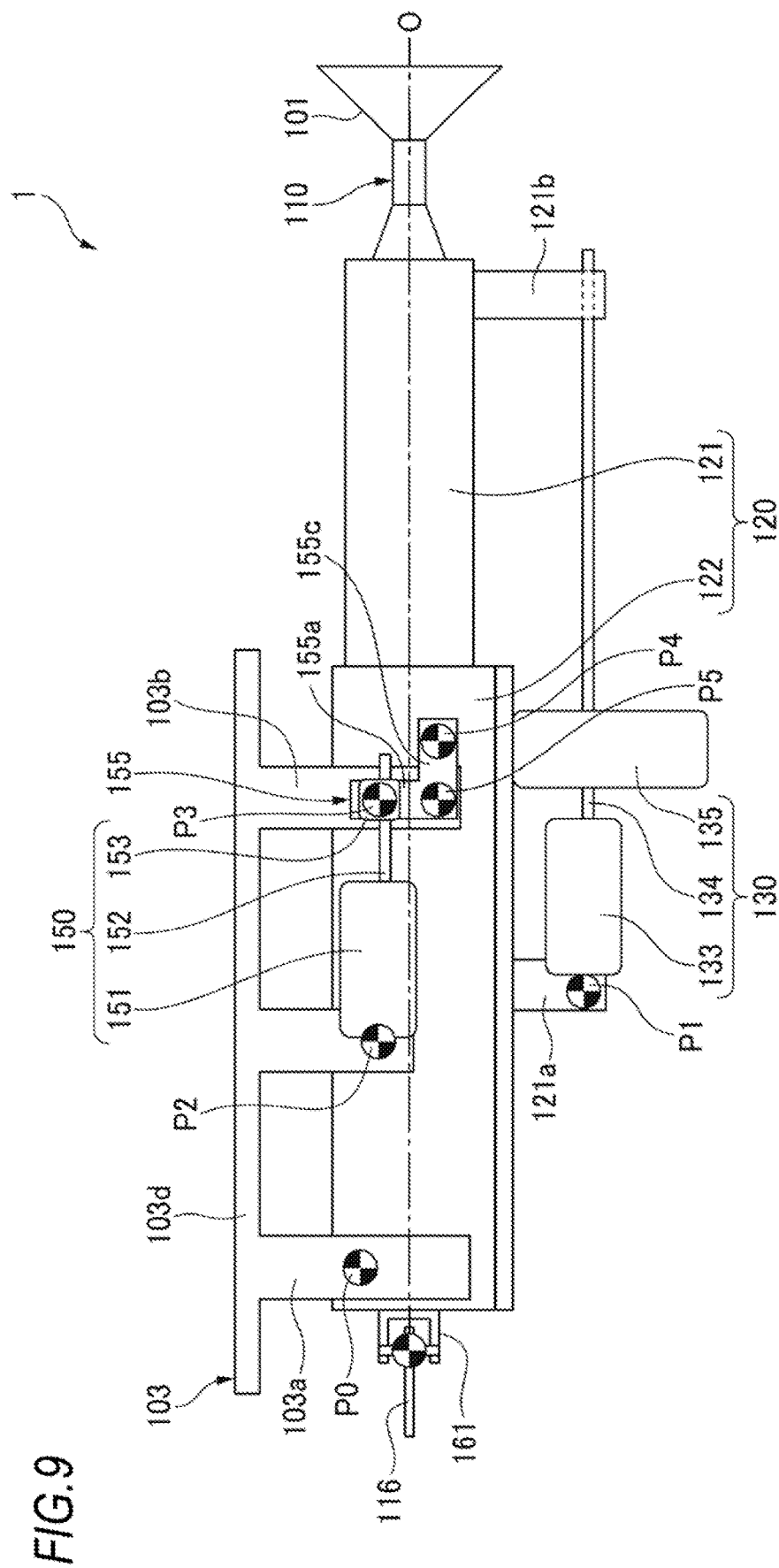
FIG. 9 is a schematic view of an electrically adjustable steering device according to a fifth embodiment.

FIG. 9 is a schematic view of an electrically adjustable steering device 1 of a fifth embodiment. In the fifth embodiment, a method of fixing the link member 155 is different from that of the fourth embodiment (see FIG. 8). Since the other configurations of the fifth embodiment are substantially the same as the configurations of the fourth embodiment, the description thereof will be omitted by adding reference numerals to the drawings.

The tilt actuator 150 includes the screw shaft 152, the tilt motor 151 which rotationally drives the screw shaft 152, and the nut 153 which is a driven portion and which is screwed onto the screw shaft 152. The tilt motor 151 is pivotably supported at the intermediate support portion 103*e* of the top bracket 103 by the pivot P2, as in the fourth embodiment. The nut 153 is pivotably connected to link member 155 by the pivot P3.

The link member 155 includes the body portion 155*a* extending in the up-down direction and the pivot portion 155*c* extending in the axial direction from the body portion 155*a*. The link member 155 is pivotably supported at the vehicle rear portion of the second jacket member 122 by the pivot P4 provided in the pivot portion 155*c*. Further, the link member 155 is fixed to the rear support portion 103*b* of the top bracket 103 by the pivot P5 provided in a lower end portion of the body portion 155*a*.

Then, by driving the tilt motor 151 to rotate the screw shaft 152, the nut 153 screwed onto the screw shaft 152 is moved. As a result, the link member 155 pivots around the pivot P5. The pivoting of the link member 155 is transmitted to the second jacket member 122 and the steering jacket 120, the steering shaft 110, and the steering wheel 101 pivot around the pivot P0. In this way, the up-down position of the steering wheel 101 is adjusted (tilted).

Also, in the present embodiment, as in the fourth embodiment, the tilt motor 151, which is a heavy object, is supported by the top bracket 103. Therefore, the natural frequency of the steering jacket 120 can be increased as compared with the case where the tilt motor 151 is fixed to the steering jacket 120.

Sixth Embodiment

Figure 10:
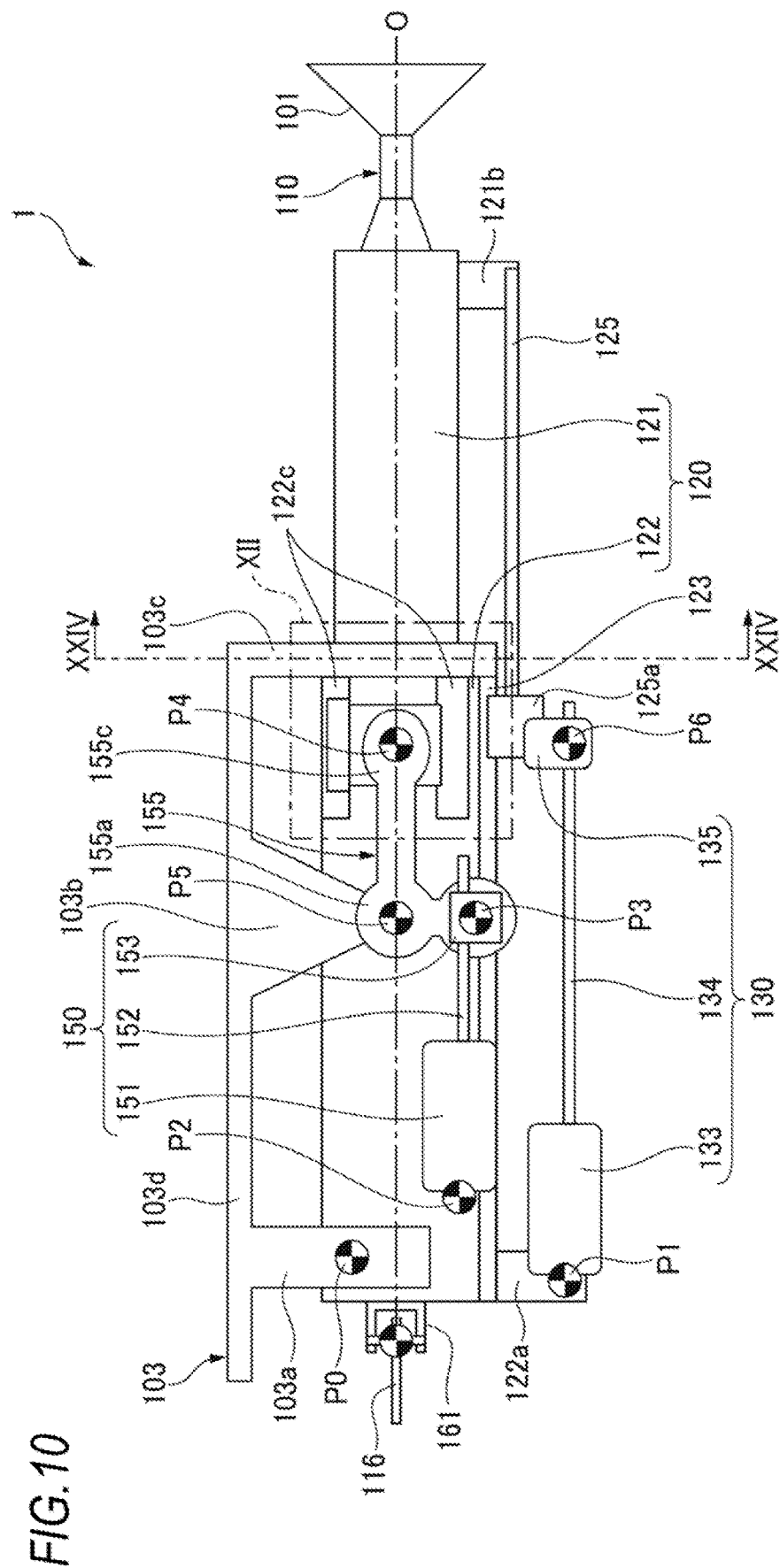
FIG. 10 is a schematic view of an electrically adjustable steering device according to a sixth embodiment.

FIG. 10 is a schematic view of an electrically adjustable steering device 1 of a sixth embodiment. In the sixth embodiment, the configurations of the telescopic actuator 130 and the tilt actuator 150 are different from those of the embodiments described above. Since the other configurations of the sixth embodiment are substantially the same as the configurations of the embodiments described above, the description thereof will be omitted by adding reference numerals to the drawings.

The telescopic actuator 130 includes the motor 133, the screw shaft 134 which is rotationally driven by the motor 133, and the nut 135 which is a driven portion and which is screwed onto the screw shaft 134. The motor 133 is pivotably connected to a convex portion 122a protruding in a radial direction from a vehicle front end portion of the second jacket member 122 via the pivot P1. The nut 135 into which the screw shaft 134 is screwed is connected to an end portion 125a on a vehicle-body front side of an extension bracket 125 via a pivot P6. The motor 133 may be pivotably connected to the top bracket 103 via the pivot P1.

Figure 11:
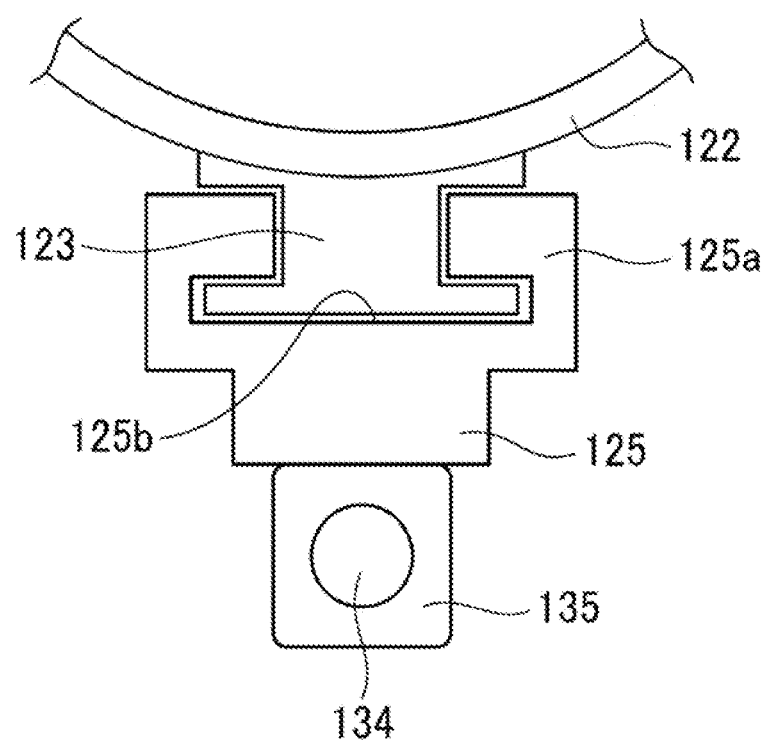
FIG. 11 is a cross-sectional view illustrating a guide portion for guiding an extension bracket.

The end portion 125a on the vehicle-body front side of the extension bracket 125 movably slides on a guide member 123 provided on an outer peripheral surface of the second jacket member 122 over an entire axial direction. FIG. 11 is a cross-sectional view illustrating the guide member 123 which guides the extension bracket 125. As illustrated in FIG. 11, the guide member 123 is a substantially inverted T-shaped ridge protruding from the outer peripheral surface of the second jacket member 122 in the radial direction and having tip portions protruding on both sides in a width direction. The guide member 123 is slidably fitted in a substantially inverted T-shaped groove 125b provided in the end portion 125a of the extension bracket 125. That is, the guide member 123 is fitted so as to be surrounded by the end portion 125a of the extension bracket 125 and slidably supports the extension bracket 125. As a result, the end portion 125a on the vehicle-body front side of the extension bracket 125 is restricted from moving in a direction orthogonal to a central axis O, that is, moving in a rotation direction and a radial direction with respect to the guide member 123. The end portion 125a of the extension bracket 125 is located further on a rear side than a front end portion of the first jacket member 121.

Then, the motor 133 of the telescopic actuator 130 is driven to rotate the screw shaft 134, so that the first jacket member 121 moves in the axial direction via the nut 135, that is, the extension bracket 125. As a result, the first jacket member 121 is pulled into and accommodated in the second jacket member 122. In this case, the steering shaft 110 is also accommodated in the second jacket member 122.

In this way, the extension bracket 125 is provided so as to protrude radially from the vehicle rear (right direction in FIG. 10) end portion of the second jacket member 122 and extend to the vehicle front part (left direction in FIG. 10) along the outer peripheral surface of the second jacket member 122. Therefore, as in the first embodiment (see FIG. 1) and the like, it is no longer necessary to provide the second jacket member 122 with a through hole (not illustrated) via which the front support portion 121a of the first jacket member 121 protrudes radially outward from the second jacket member 122. As a result, the rigidity of the second jacket member 122 can be maintained high.

The tilt actuator 150 includes the screw shaft 152, the tilt motor 151 which rotationally drives the screw shaft 152, and the nut 153 which is a driven portion and which is screwed onto the screw shaft 152. The tilt motor 151 is pivotably supported at the front portion of the second jacket member 122 by the pivot P2. The nut 153 is pivotably connected to the link member 155 by pivot P3.

The link member 155 has a body portion 155a extending in the up-down direction and a pivot portion 155c extending in the axial direction from the body portion 155a.

The link member 155 is pivotably supported at the vehicle rear portion of the second jacket member 122 by the pivot P4 provided in the pivot portion 155c. Further, the link member 155 is fixed to the rear support portion 103b of the top bracket 103 by the pivot P5 provided in the upper end portion of the body portion 155a.

Figure 12:
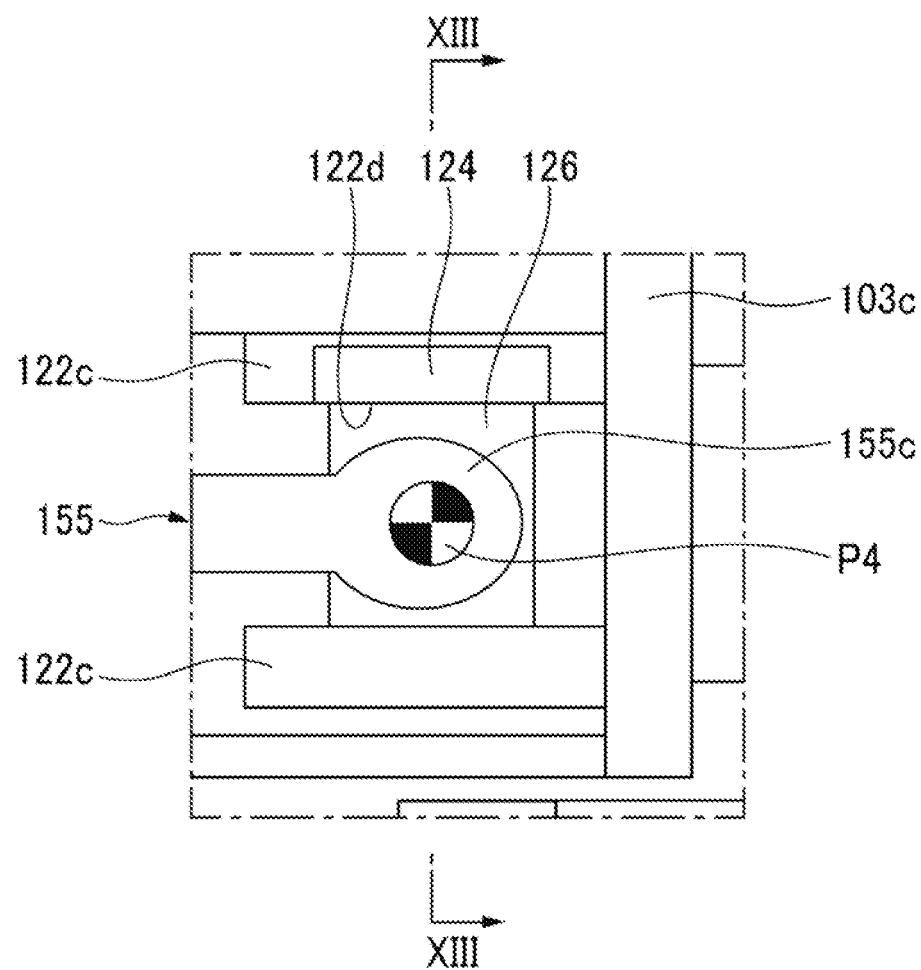
FIG. 12 is an enlarged view of the XII portion of FIG. 10.
Figure 13:
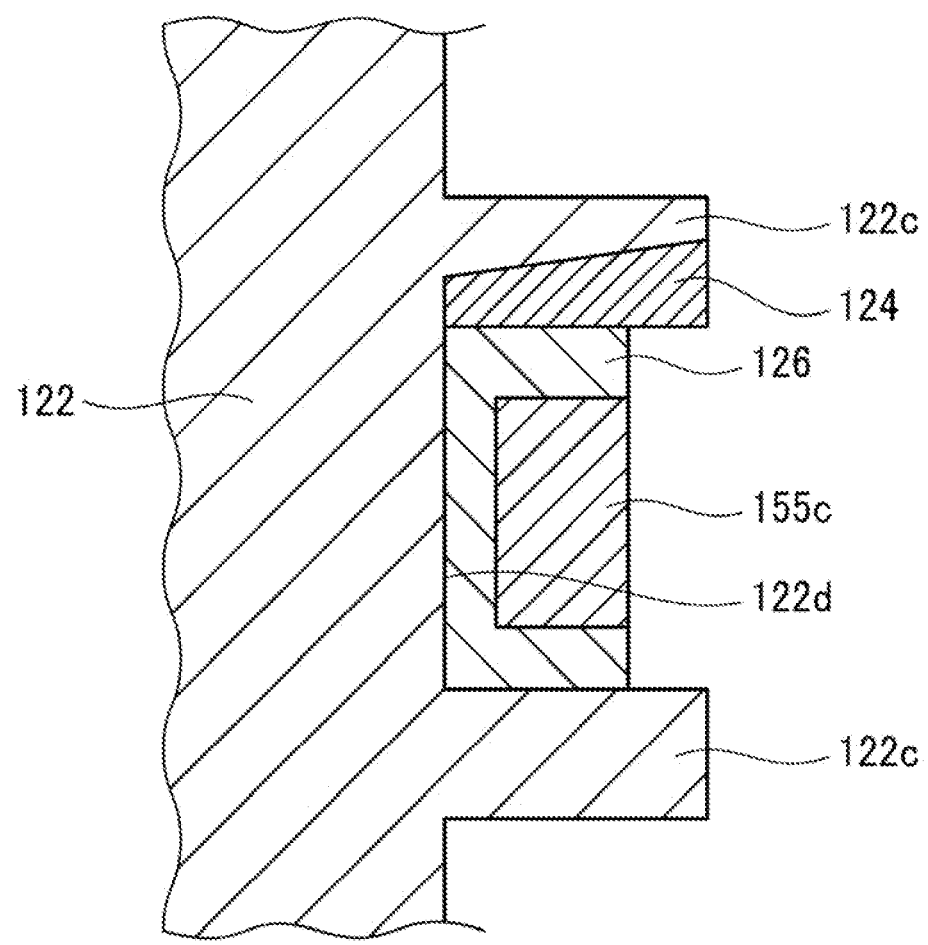
FIG. 13 is a cross-sectional arrow view taken along the line XIII-XIII of FIG. 12.

FIG. 12 is an enlarged view of the XII portion of FIG. 10. FIG. 13 is a cross-sectional arrow view taken along the line XIII-XIII of FIG. 10. On the outer peripheral surface of the second jacket member 122, a pair of protrusions 122c and 122c are formed so as to protrude in the vehicle left-right direction (the direction toward the front of the paper in FIGS. 10 and 12; the left-right direction in FIG. 13) and separated from each other in the up-down direction. Therefore, a groove portion 122d is formed between the pair of protrusions 122c and 122c. A bush 126 which supports the pivot portion 155c of the link member 155 is disposed in the groove portion 122d. A tip portion of the pivot portion 155c is substantially disk-shaped and the bush 126 pivotably supports a tip portion of the pivot portion 155c inside. A wedge member 124 is disposed between the bush 126 and the protrusion 122c, thereby eliminating the backlash between the bush 126 and the protrusion 122c, that is, the backlash between the second jacket member 122 and the link member 155. In this way, the pivot P4 as the second pivot is configured.

Then, by driving the tilt motor 151 to rotate the screw shaft 152, the nut 153 screwed onto the screw shaft 152 is moved. As a result, the link member 155 pivots around the pivot P5. The pivoting of the link member 155 is transmitted to the second jacket member 122 and the steering jacket 120, the steering shaft 110, and the steering wheel 101 pivot around the pivot P0. In this way, the up-down position of the steering wheel 101 is adjusted (tilted).

As described above, according to the present embodiment, a wedge member 124 removes the backlash between the second jacket member 122 and the link member 155, so that the tilt operation can be performed with high accuracy.

EXAMPLE

Figure 14:
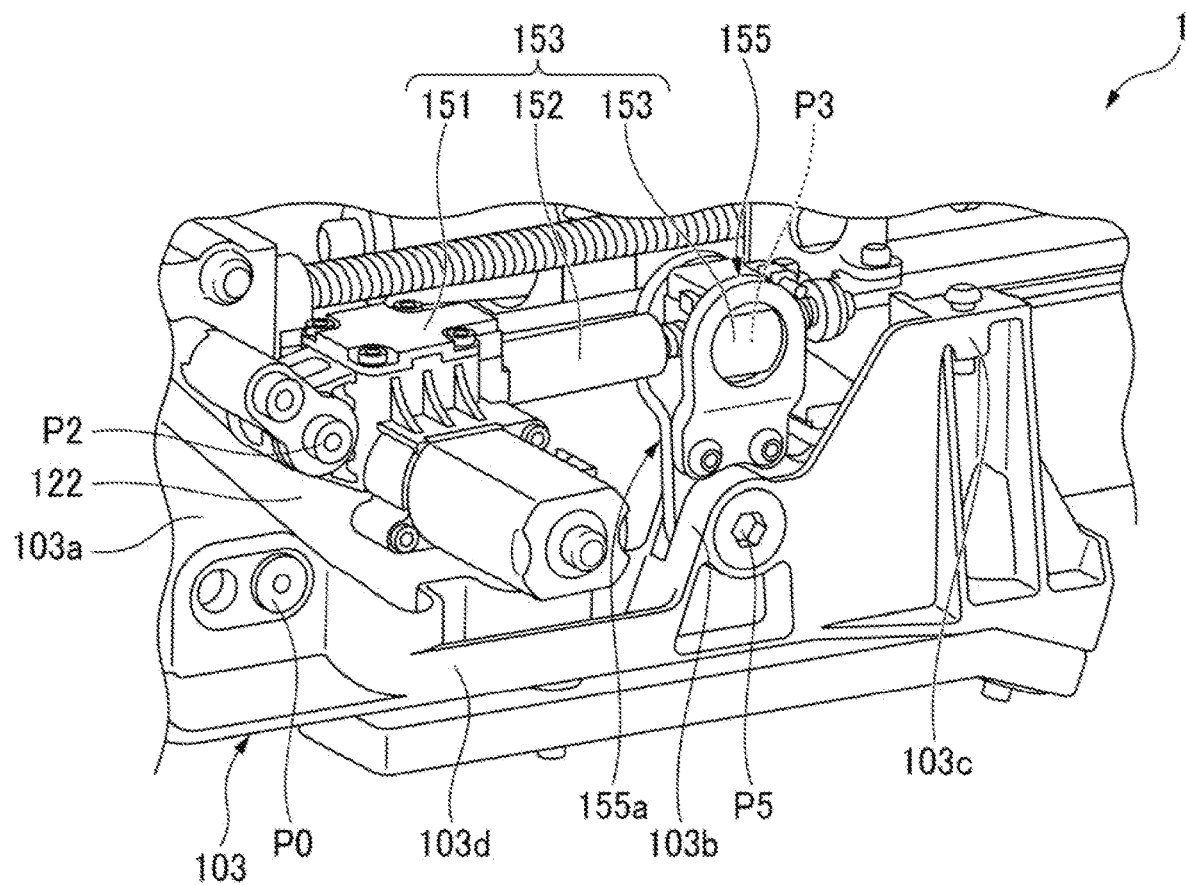
FIG. 14 is a perspective view of a main part of an electrically adjustable steering device to which the sixth embodiment is applied.
Figure 15:
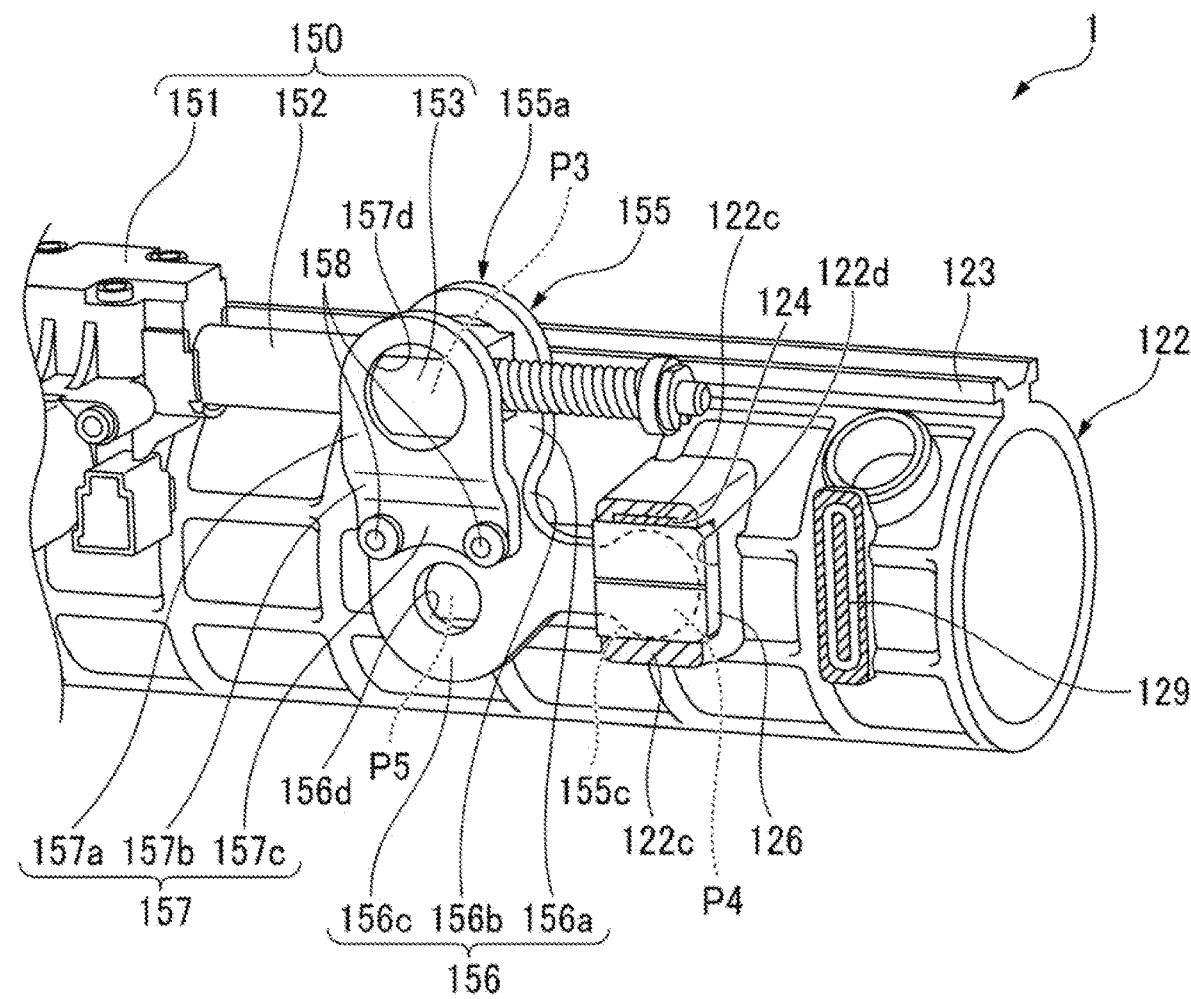
FIG. 15 is a perspective view of a main part of the electrically adjustable steering device to which the sixth embodiment is applied, in which a top bracket is omitted.

Although various embodiments are described above with reference to the schematic diagram of the electrically adjustable steering device 1, a specific configuration of the electrically adjustable steering device 1 will be described below. FIG. 14 is a perspective view of a main part of an electrically adjustable steering device 1 to which the sixth embodiment (see FIGS. 10 to 13) is applied and FIG. 15 is a perspective view of a main part of the electrically adjustable steering device 1 to which the sixth embodiment (see FIGS. 10 to 13) is applied, in which the top bracket 103 is omitted. The up-down direction in FIGS. 14 and 15 is opposite to the up-down direction in FIG. 10. The upward direction in FIGS. 14 and 15 is a vehicle downward direction and the downward direction in FIGS. 14 and 15 is a vehicle upward direction.

As described above, the tilt actuator 150 includes the screw shaft 152, the tilt motor 151 which rotationally drives the screw shaft 152, and the nut 153 which is a driven portion and which is screwed onto the screw shaft 152. The tilt motor 151 is pivotably supported at the front portion of the second jacket member 122 by the pivot P2 as the fourth pivot. The nut 153 is pivotably connected to the link member 155 by the pivot P3 as the first pivot. In FIG. 14, the illustration of the pivot P3 is omitted and the provided portion thereof is indicated by a broken leader line. Further, in FIG. 15, the illustration of the pivots P3 and P5 is omitted and the provided portions thereof are indicated by a broken leader line.

The link member 155 is placed only on one side of the steering jacket 120 and the steering shaft 110 in the vehicle left-right direction. The link member 155 includes the body portion 155a extending in the up-down direction and the pivot portion 155c extending in the axial direction from the body portion 155a. The body portion 155a includes a first part, which supports nut 153 from the left-right direction and is pivotably fixed to the nut 153 by the pivot P3 as the first pivot, and a second part, which is pivotably fixed to the top bracket 103 by the pivot P5 as the third pivot. The first part includes a support portion 156a of a first link piece 156 and a support portion 157a of a second link piece 157, which will be described below, and the second part includes a base portion 157c of the first link piece 156, which will be described below. Further, the pivot portion 155c is pivotably fixed to the second jacket member 122 by the pivot P4 as the third pivot.

Figure 16:
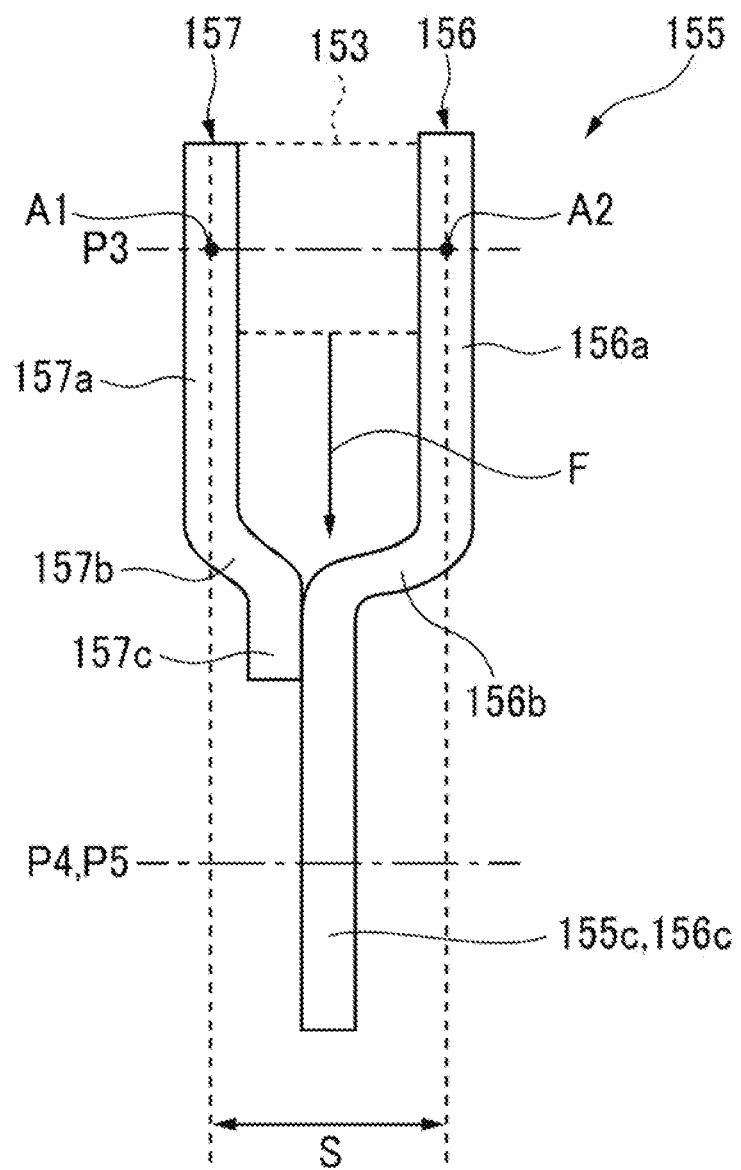
FIG. 16 is a view of a link member as viewed from a vehicle front side.

FIG. 16 is a view of the link member 155 as viewed from the vehicle front side. In FIG. 16, the illustration of the pivot P3, P4, and P5 is omitted and the provided portions thereof are indicated by a broken leader line. As illustrated in FIGS. 15 and 16, the body portion 155a includes the first link piece 156 and the second link piece 157 fixed to the first link piece 156 by a pair of bolts 158, 158. In the vehicle left-right direction, the first link piece 156 is disposed inside (the side closer to the second jacket member 122) and the second link piece 157 is disposed outside.

The first link piece 156 includes the support portion 156a extending in the up-down direction between the nut 153 and the second jacket member 122 to support the nut 153 via the pivot P3, an inclined portion 156b extending upward from the upper end (the lower end in FIGS. 15 and 16) of the support portion 156a so as to be inclined outward in the vehicle left-right direction, and a base portion 156c which extends upward from an upper end of the inclined portion 156b and is fixed to the second jacket member 122 by the pivot P5.

The support portion 156a is provided with a pivot hole (not illustrated) for fixing the pivot P3. A pair of bolt holes (not illustrated) for fixing the pair of bolts 158 and 158 are provided in a lower portion (upper portion in FIGS. 15 and 16) of the base portion 156c and a pivot hole 156d for fixing the pivot P5 is provided in an upper portion (lower portion in FIGS. 15 and 16) of the base portion 156c. The pivot portion 155c of the link member 155 is integrally formed with the first link piece 156 and extends axially from the base portion 156c of the first link piece 156.

The second link piece 157 includes the support portion 157a which is placed further on an outer side than the nut 153 in the vehicle left-right direction, extends in the up-down direction, and supports the nut 153 via the pivot P3, an inclined portion 157b extending upward from an upper end (lower end in FIGS. 15 and 16) of the support portion 157a so as to be inclined inward in the vehicle left-right direction, and the base portion 157c extending upward from an upper end of the inclined portion 157b.

The support portion 157a is provided with a pivot hole 157d for fixing the pivot P3. The base portion 157c is provided with a pair of bolt holes 157e and 157e (see FIG. 17 described below) for fixing the pair of bolts 158 and 158. An up-down width of the base portion 157c of the second link piece 157 is smaller than an up-down width of the base portion 156c of the first link piece 156 and the base portion 157c of the second link piece 157 is placed so as not to overlap a pivot hole 156d of the base portion 156c of the first link piece 156.

Then, the nut 153 of the tilt actuator 150 is fixed to the first link piece 156 and the second link piece 157 by the pivot P3 in a state of being pinched by the first link piece 156 and the second link piece 157 from both the left and right sides of the vehicle. Therefore, since the nut 153 is supported by the link member 155 from both the left and right sides of the vehicle, the rigidity of the fixed portion between the nut 153 and the link member 155 can be increased.

As illustrated in FIG. 16, during the tilt adjustment, a load F is generated from the nut 153 to the link member 155 in the vehicle up-down direction (up-down direction in FIG. 16). Here, in the present embodiment, the pivot portions P4 and P5, the pivot portion 155c provided with the pivot P4, and the base portion 156c provided with the pivot P5 are located within a range S. Here, the range S is a range between a pair of nut fixing positions A1 and A2 in the vehicle left-right direction, which are the positions where the nut 153 is fixed to the pair of support portions 156a and 157a by the pivot P3. More preferably, the pivot portions P4 and P5, the pivot portion 155c provided with the pivot P4, and the base portion 156c provided with the pivot P5 are disposed at the center of the pair of nut fixing positions A1 and A2 in the vehicle left-right direction, that is, at the center of the range S. Therefore, since the load F can be efficiently received by the pivot portion 155c and the base portion 156c, the deformation of the link member 155 is suppressed, and thus the rigidity of the link member 155 does not decrease. Further, in order to improve the rigidity, in the link member 155, the pivot portion 155c provided with the pivot P4 and the base 156c provided with the pivot P5 are preferably formed in a substantially flat plate shape as shown in the illustrated example and the shape bent in the vehicle left-right direction is not preferable.

The link member 155 is pivotably supported at the vehicle rear portion of the second jacket member 122 by the pivot P4 provided in the pivot portion 155c.

Figure 17:
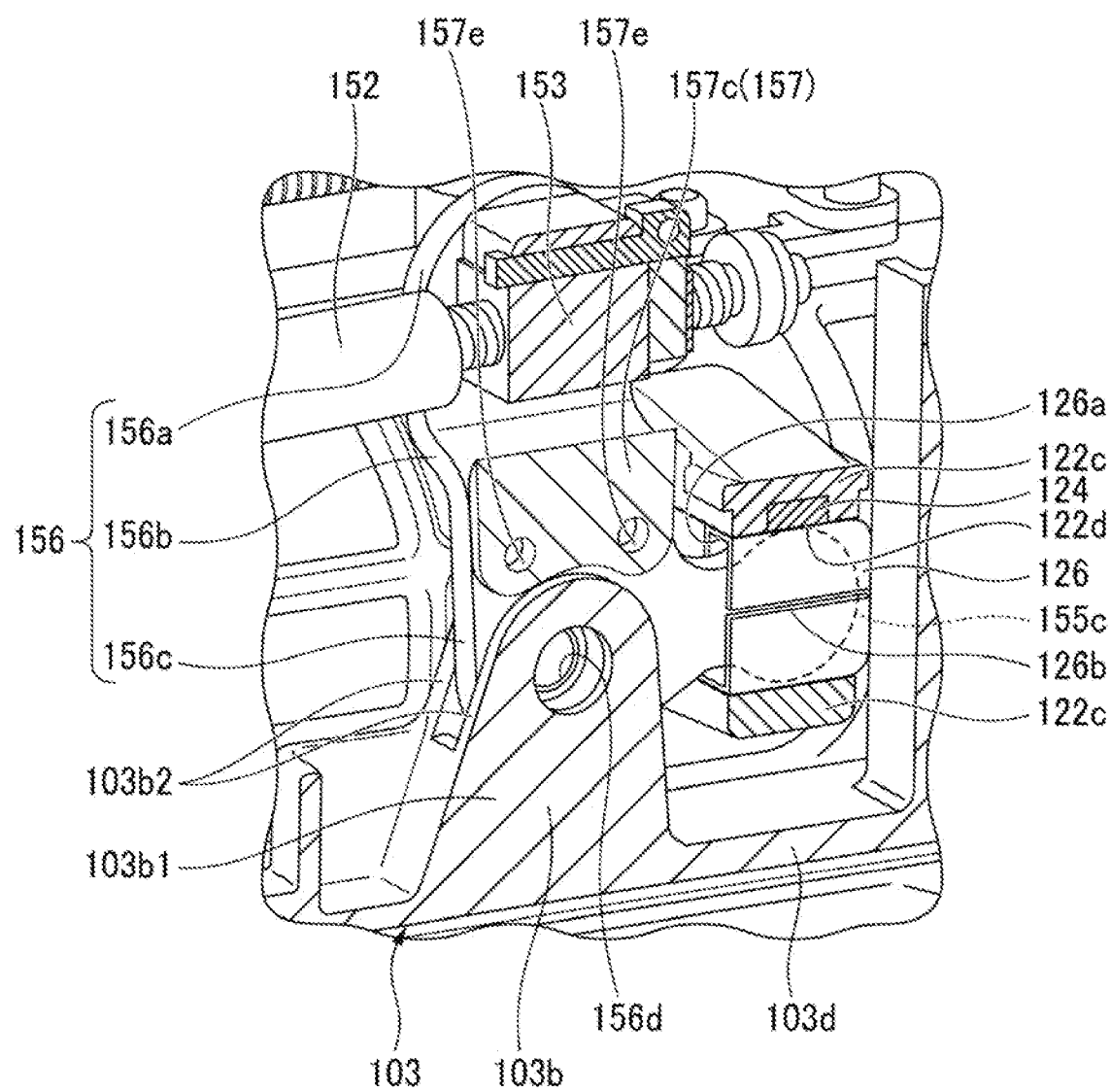
FIG. 17 is a diagram illustrating a part around the link member with broken partially.
Figure 18:
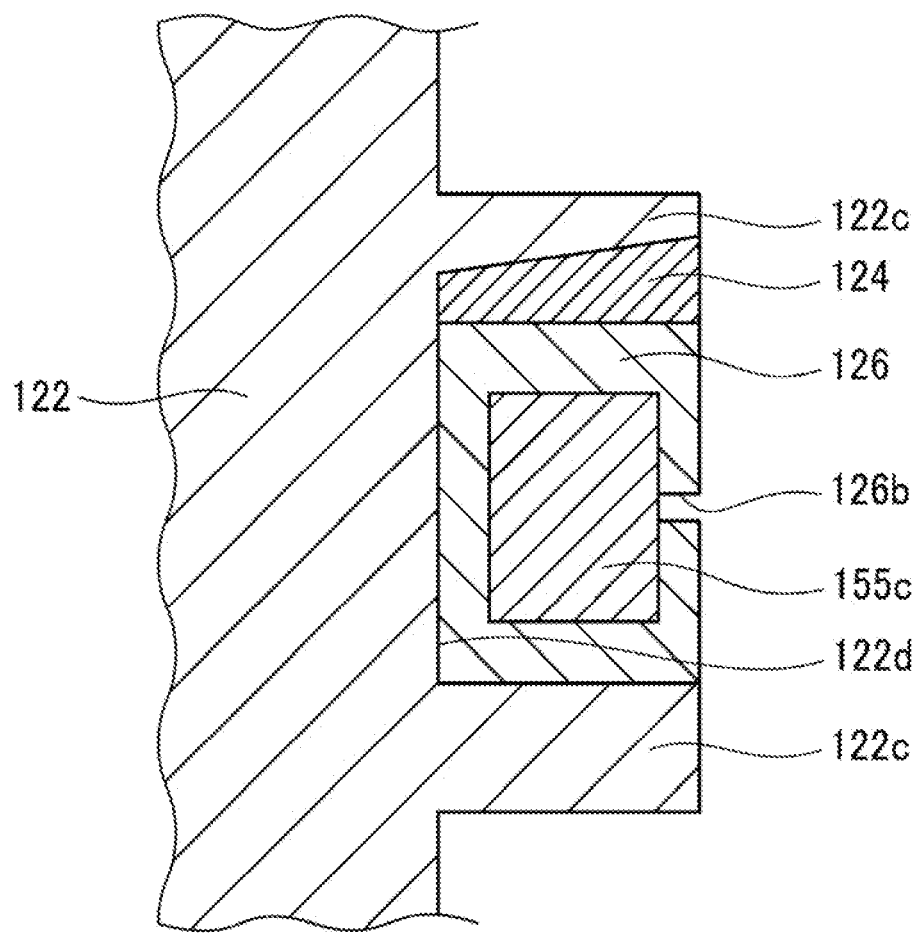
FIG. 18 is a schematic cross-sectional view of a periphery of a pivot portion of the link portion.

FIG. 17 is a diagram illustrating a part around the link member 155 with broken partially. FIG. 18 is a schematic cross-sectional view of a periphery of the pivot portion 155c of the link member 155. As illustrated in FIGS. 15, 17, and 18, on the outer peripheral surface of the second jacket member 122, a pair of protrusions 122c and 122c are formed so as to protrude to one side in the vehicle left-right direction and are separated from each other in the up-down direction. Therefore, the groove portion 122d is formed between the pair of protrusions 122c and 122c. The bush 126 which internally supports the pivot portion 155c of the link member 155 is placed in the groove portion 122d. The bush 126 has a container shape having an opening 126a for inserting the pivot portion 155c on the vehicle front side. Further, a slit 126b extending in the vehicle front-rear direction is formed on an outer surface of the bush 126 in the vehicle left-right direction. A tip portion of the pivot portion 155c is substantially disk-shaped and the bush 126 pivotably supports the tip portion of the pivot portion 155c inside. As a result, the pivot portion 155c of the link member 155 is pivotably supported so as to be surrounded by the second jacket member 122 and the pivot P4 as the second pivot is configured.

Figure 19:
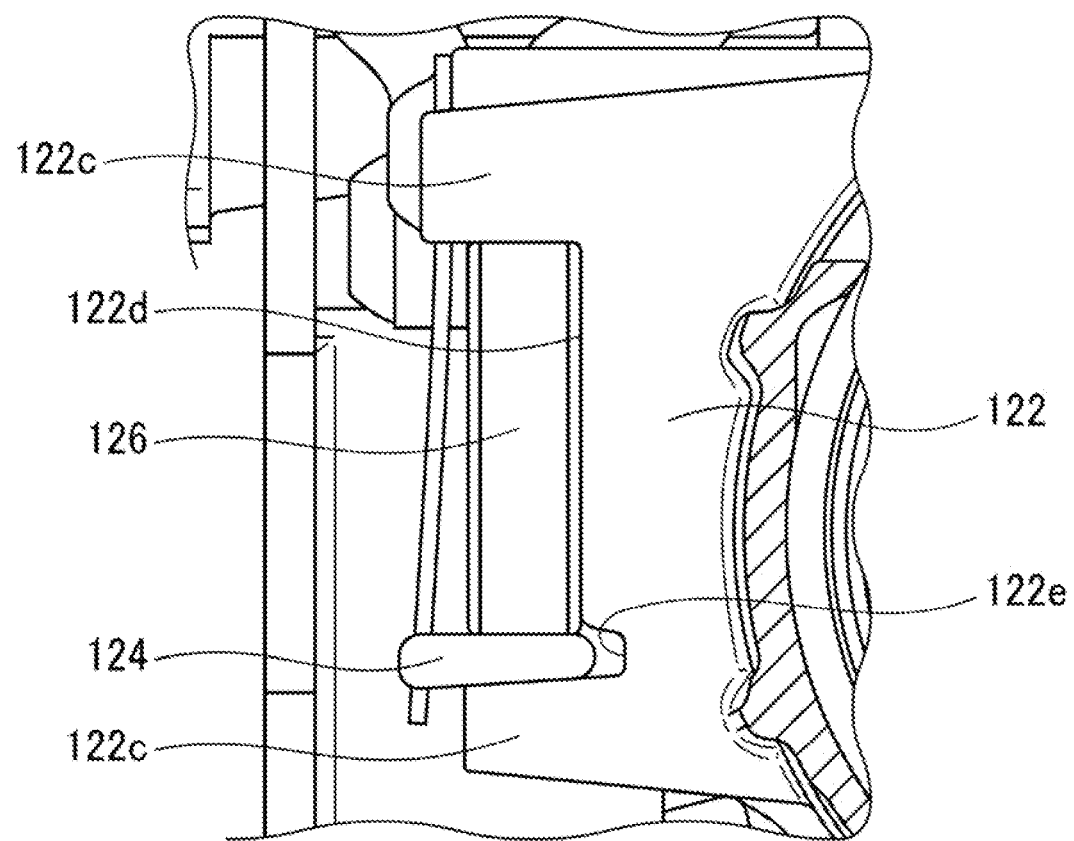
FIG. 19 is a view of the periphery of the pivot portion of the link portion as viewed from a vehicle front-rear direction.

FIG. 19 is a view of the periphery of the pivot portion 155c of the link member 155 as viewed from the vehicle front-rear direction. As illustrated in FIGS. 15, 17, 18, and 19, the wedge member 124 is placed between the bush 126 and the protrusion 122c, thereby eliminating the backlash between the bush 126 and the protrusion 122c, that is, the backlash between the second jacket member 122 and the pivot portion 155c of the link member 155. In this example, a concave groove 122e for receiving the wedge member 124 is formed at the up-down-direction end portion of the groove portion 122d. The wedge member 124 in FIG. 19 has a wedge shape in which the up-down width decreases from the outside to the inside in the vehicle left-right direction. However, the shape of the wedge member 124 is not particularly limited as long as the wedge effect is obtained, and for example, the wedge member 124 may have a wedge shape in which the up-down width changes toward the vehicle front-rear direction.

Figure 20:
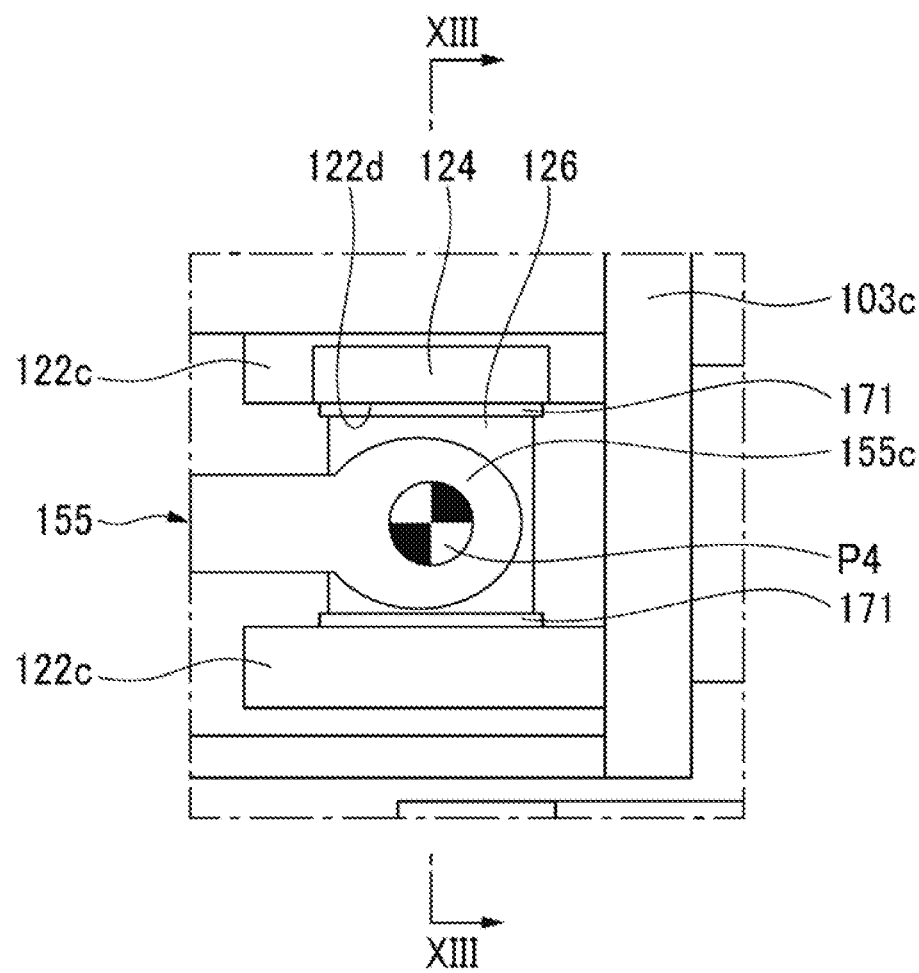
FIG. 20 is a schematic view of a periphery of a pivot portion of a link member according to a modification example.

FIG. 20 is a schematic view of the periphery of the pivot portion 155c of the link member 155 according to a modification example. As illustrated in FIG. 20, a cover 171 may be disposed between the bush 126 and the wedge member 124, and between the bush 126 and the protrusion 122c. During a tilt operation, the bush 126 moves in the vehicle front-rear direction with respect to the wedge member 124 and the protrusion 122c, but it is not preferable that these members slide directly, so the cover 171 is provided. The cover 171 may be fixed to any of the bush 126, the wedge member 124, and the protrusion 122c.

Figure 21:
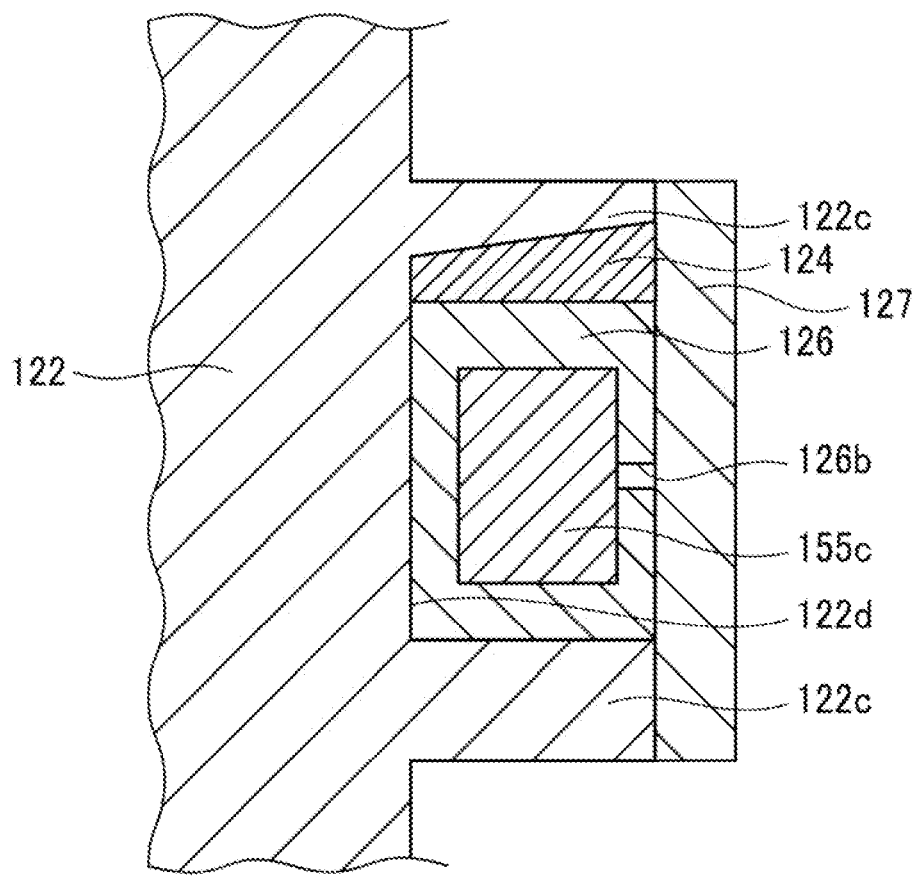
FIG. 21 is a schematic cross-sectional view of the periphery of a pivot portion of a link portion according to the modification example.

FIG. 21 is a schematic cross-sectional view of the periphery of the pivot portion 155c of the link member 155 according to the modification example. As illustrated in FIG. 21, a lid member 127 placed so as to straddle tip portions of the pair of protrusions 122c and 122c of the second jacket member 122 and cover the bush 126 may be provided.

Figure 22:
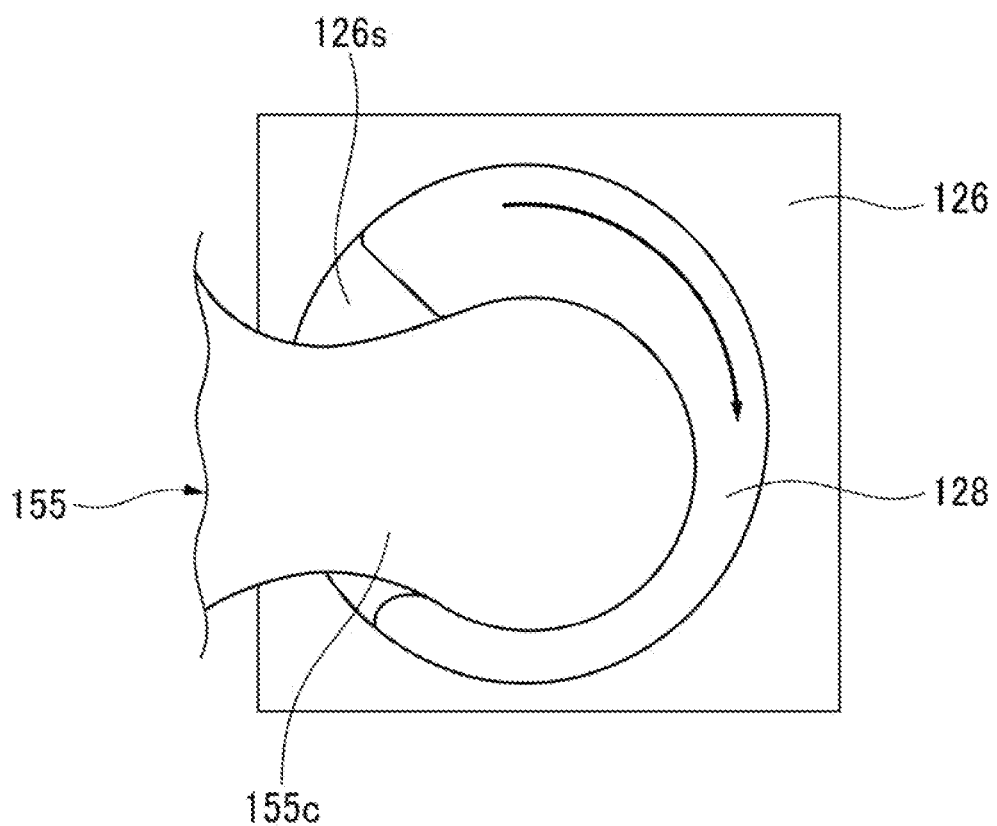
FIG. 22 is a diagram illustrating a bush according to the modification example.

FIG. 22 is a diagram illustrating the bush 126 according to the modification example. Inside the bush 126, an internal space 126s accommodating the pivot portion 155c of the link member 155 is formed. Although the pivot portion 155c is inserted into the internal space 126s with a gap, rattling may occur due to the gap. Therefore, in the internal space 126s, a cam member 128 is disposed around the pivot portion 155c. Backlash is suppressed and rigidity is increased by applying a preload to the pivot portion 155c in a direction of the arrow in FIG. 22 by the cam member 128. A spring member or the like may be adopted instead of the cam member 128 to give a preload to the pivot portion 155c to reduce backlash.

As illustrated in FIGS. 14 and 17, the link member 155 is fixed to the rear support portion 103b of the top bracket 103 by the pivot P5 provided in the base portion 156c of the first link piece 156 of the body portion 155a. The rear support portion 103b includes a connection portion 103b1 connected to the base portion 103d of the top bracket 103 and a pair of support pieces 103b2 and 103b2 extending downward (upward in FIG. 17) from both vehicle-left-right-direction sides of the lower end portion (upper end portion in FIG. 17) of the connection portion 103b1. Then, the link member 155 (base portion 156c of the first link piece 156 of the body portion 155a) is fixed to the top bracket 103 by the pivot P5 in a state of being supported so as to be pinched between the pair of support pieces 103b2 and 103b2. Therefore, the rigidity of the fixed portion between the link member 155 and the top bracket 103 can be increased.

Figure 23:
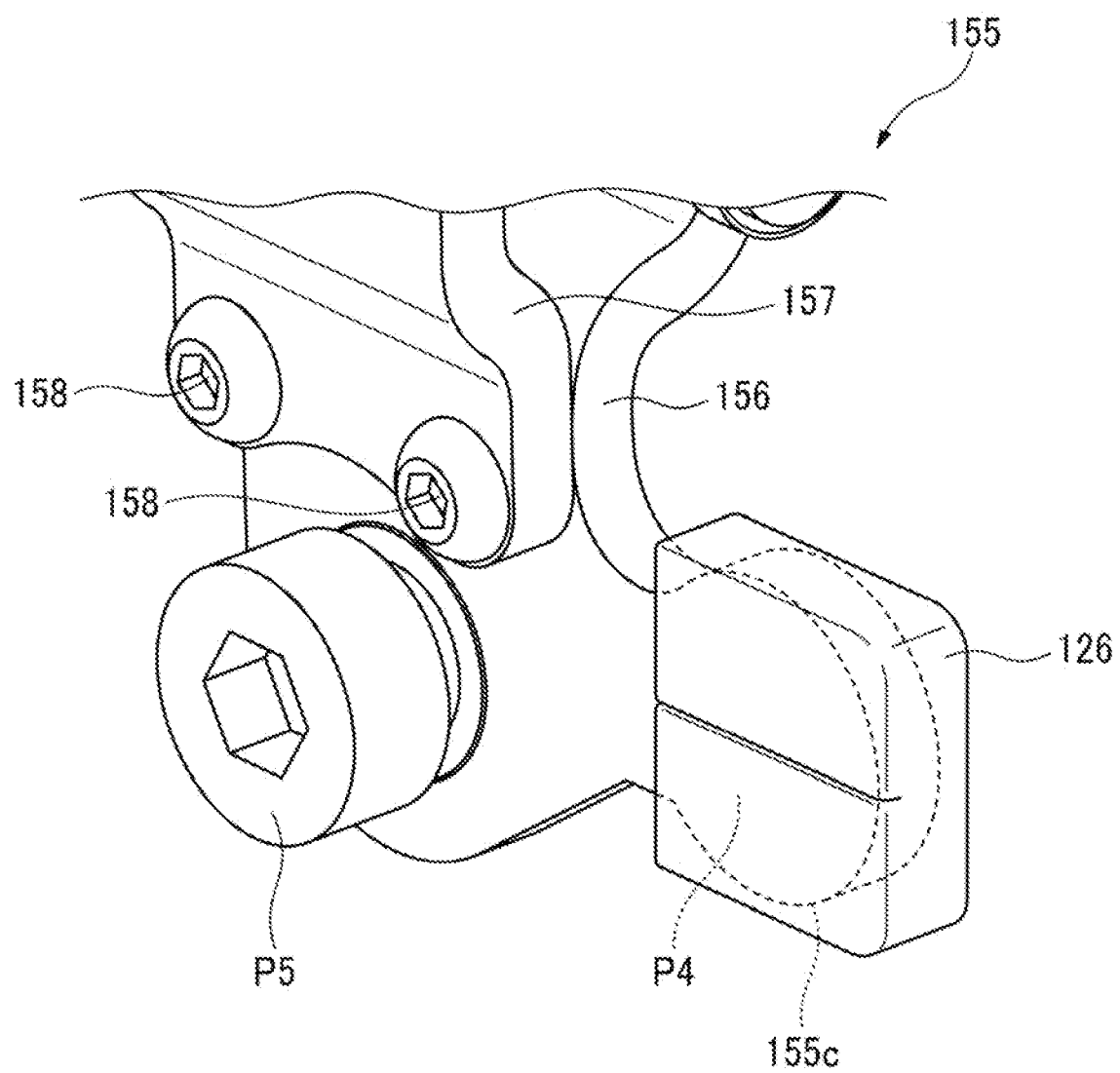
FIG. 23 is a diagram illustrating the link member according to the modification example.

FIG. 23 illustrates the link member 155 according to the modification example. In the example described above, the pivot portion 155c of the link member 155 is fixed to the second jacket member 122 by the pivot P4 as the second pivot and the body portion 155a of the link member 155 is fixed to the top bracket 103 by the pivot P5 as the third pivot. However, as illustrated in FIG. 23, the pivot portion 155c of the link member 155 may be fixed to the top bracket 103 by the pivot P4 as the second pivot and the body portion 155a of the link member 155 may be fixed to the second jacket member 122 by the pivot P5 as the third pivot.

Figure 24:
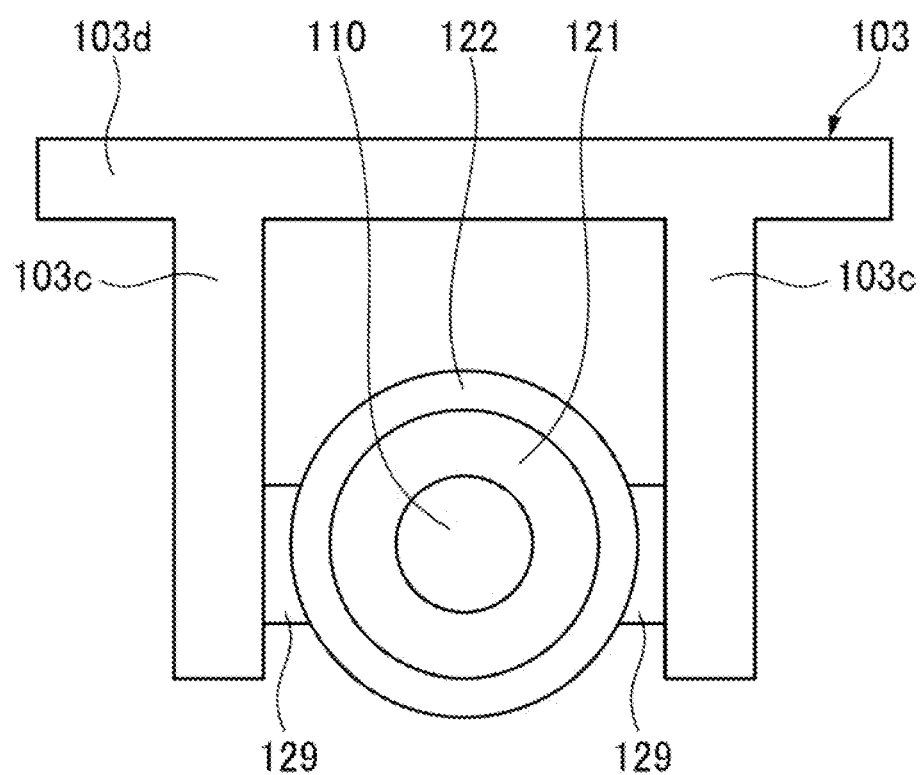
FIG. 24 is a cross-sectional arrow view taken along the line XXIV-XXIV of FIG. 10.

FIG. 24 is a cross-sectional arrow view taken along the line XXIV-XXIV of FIG. 10. As illustrated in FIGS. 15 and 24, a pair of pads 129 and 129 protruding in the vehicle left-right direction are provided on an outer peripheral surface of the second jacket member 122.

The pair of pads 129 and 129 are located further on the vehicle rear part than positions where the pair of protrusion 122c and the pivot P4 are provided and are pinched from the outside in the vehicle left-right direction by the pair of rear end support portions 103c and 103c of the top bracket 103. The pair of rear end support portions 103c and 103c hold the pair of pads 129 and 129 in a slidable manner without rattling in the vehicle left-right direction. The pair of pads 129 and 129 may be made of a low friction material such as resin, or may be made by coating the second jacket member 122 with a low friction material. With such a configuration, the second jacket member 122 is prevented from rotating or moving in the left-right direction. Therefore, in the electrically adjustable steering device 1 of the present embodiment, the rigidity in the vehicle left-right direction is enhanced by the pair of rear end support portions 103c and 103c which support the pair of pads 129 and 129 from the vehicle left-right direction and the rigidity in the vehicle up-down direction is enhanced by the pair of protrusions 122c and 122c which support the pivot portion 155c of the link member 155 from the vehicle up-down direction.

Then, by driving the tilt motor 151 to rotate the screw shaft 152, the nut 153 screwed onto the screw shaft 152 is moved. As a result, the link member 155 pivots around the pivot P5. The pivoting of the link member 155 is transmitted to the second jacket member 122 and the steering jacket 120, the steering shaft 110, and the steering wheel 101 pivot around the pivot P0. In this way, the up-down position of the steering wheel 101 is adjusted (tilted).

Figure 25:
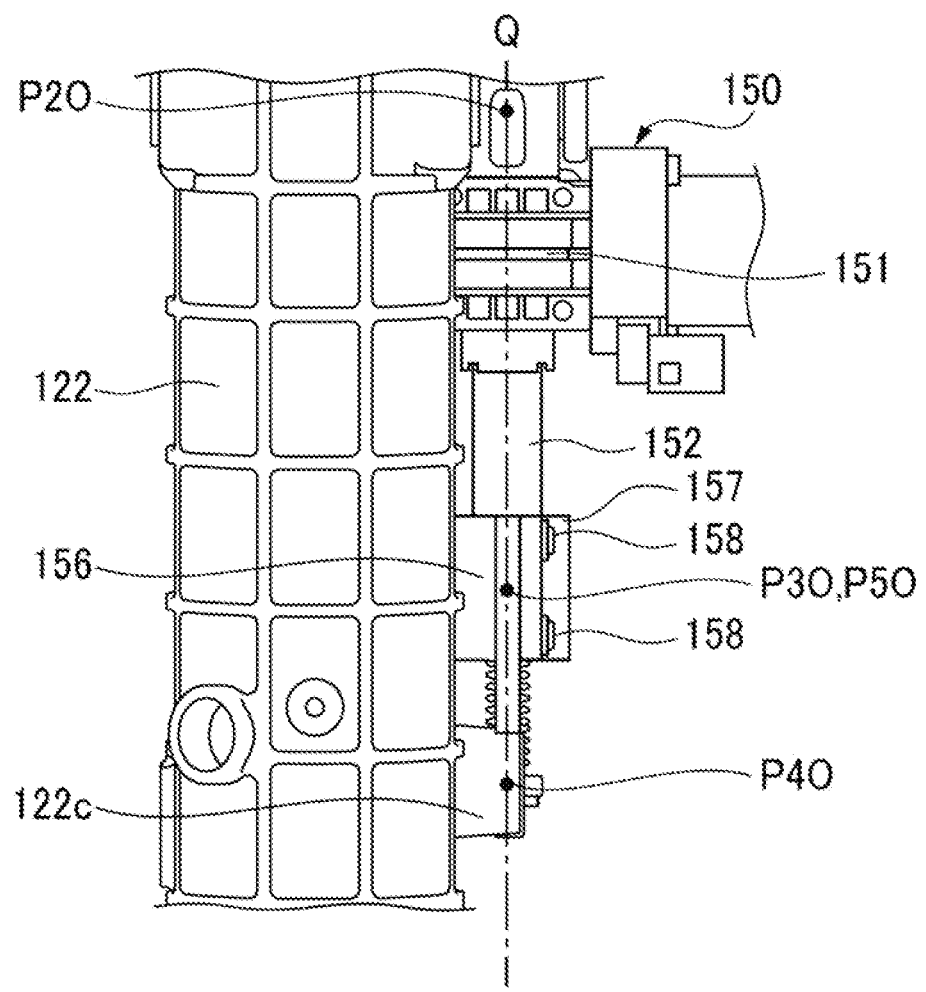
FIG. 25 is a view of the electrically adjustable steering device as viewed from below.
Figure 26:
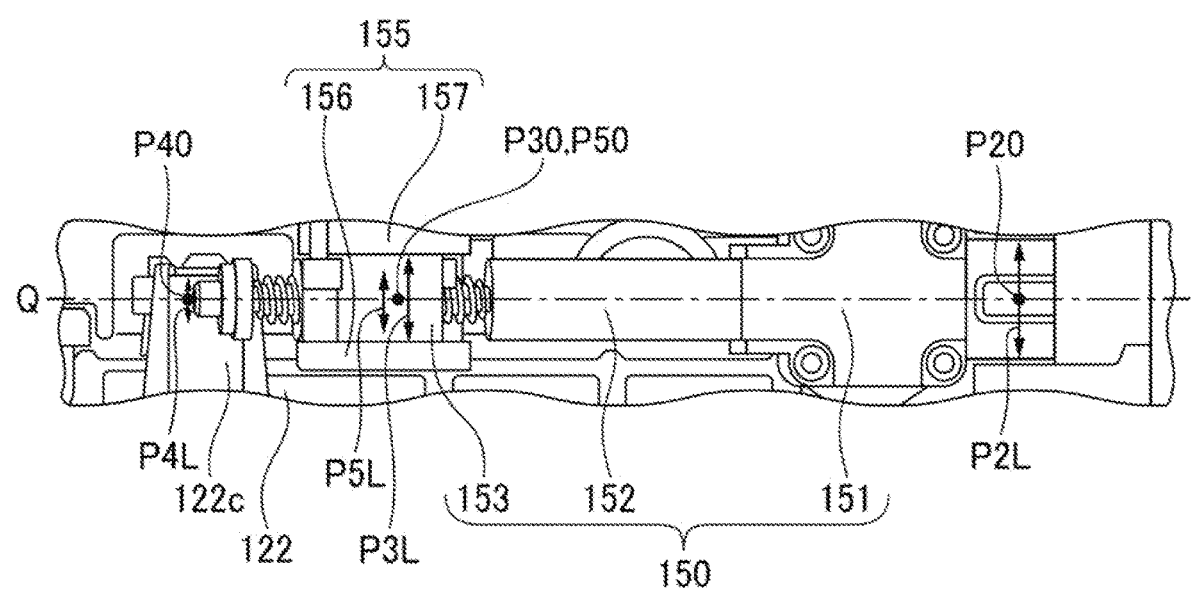
FIG. 26 is an enlarged view of a main part in FIG. 25.
Figure 27:
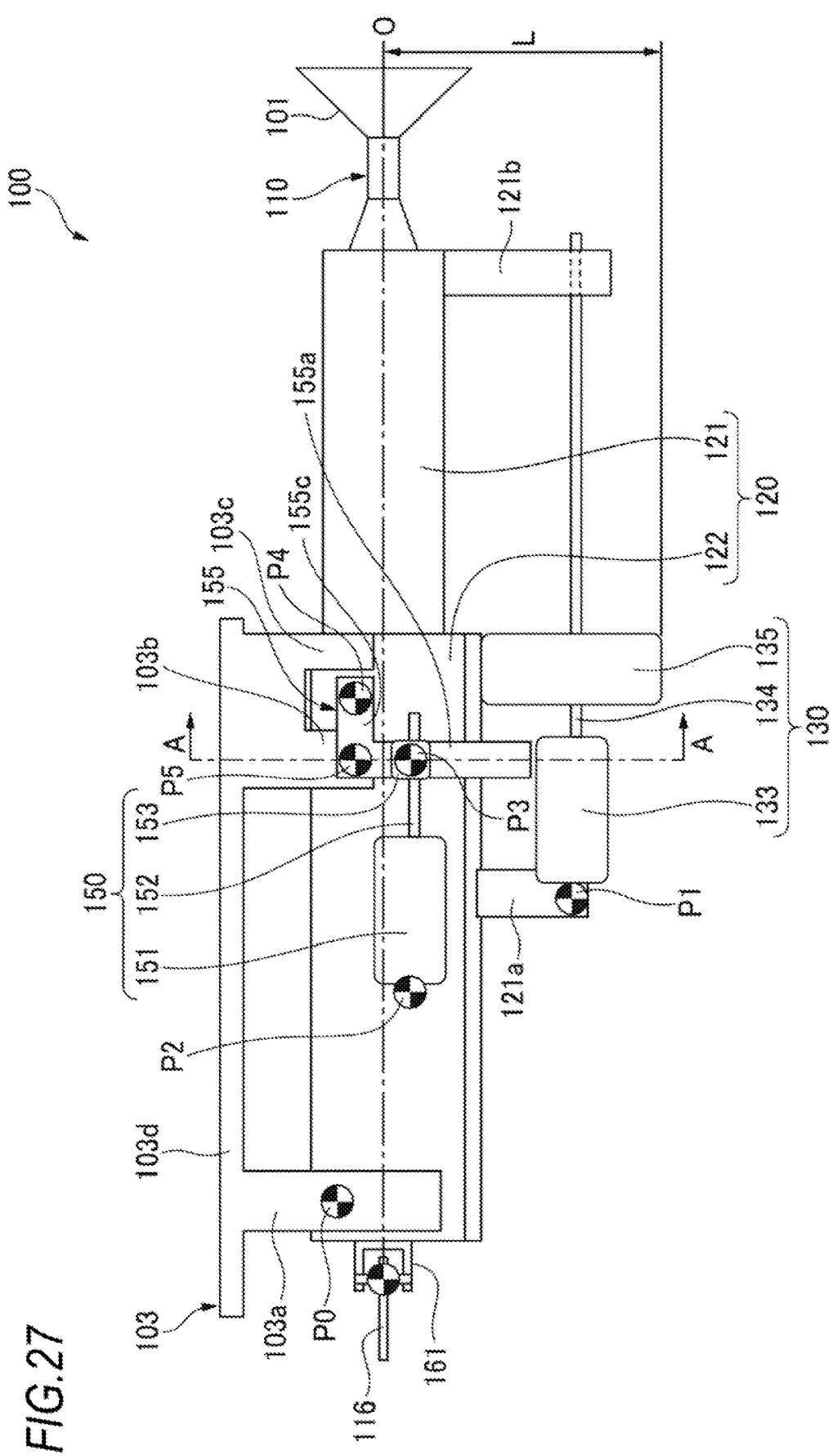
FIG. 27 is a schematic view of an electrically adjustable steering device according to a first example of the related art.
Figure 28:
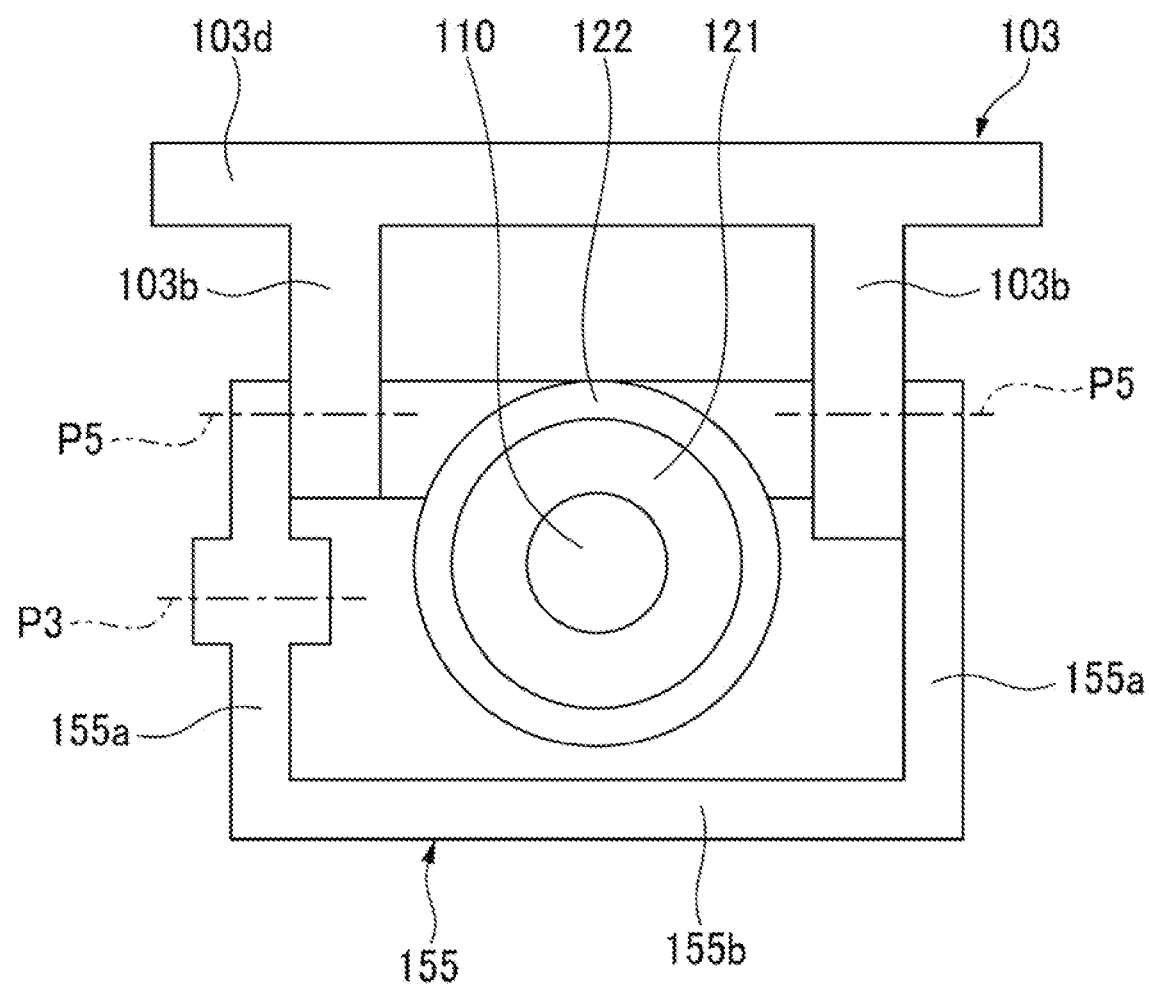
FIG. 28 is a cross-sectional arrow view taken along the line A-A in FIG. 27.
Figure 29:
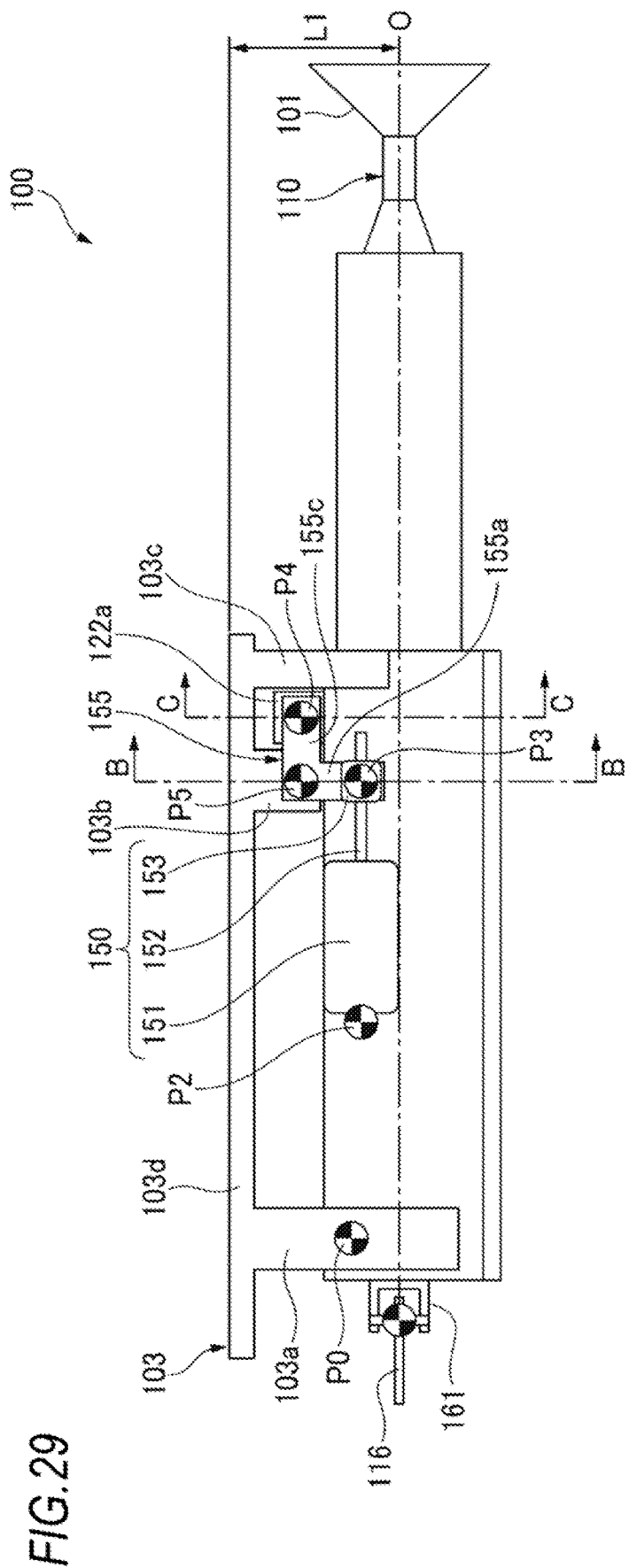
FIG. 29 is an electrically adjustable steering device according to a second example of the related art.
Figure 30:
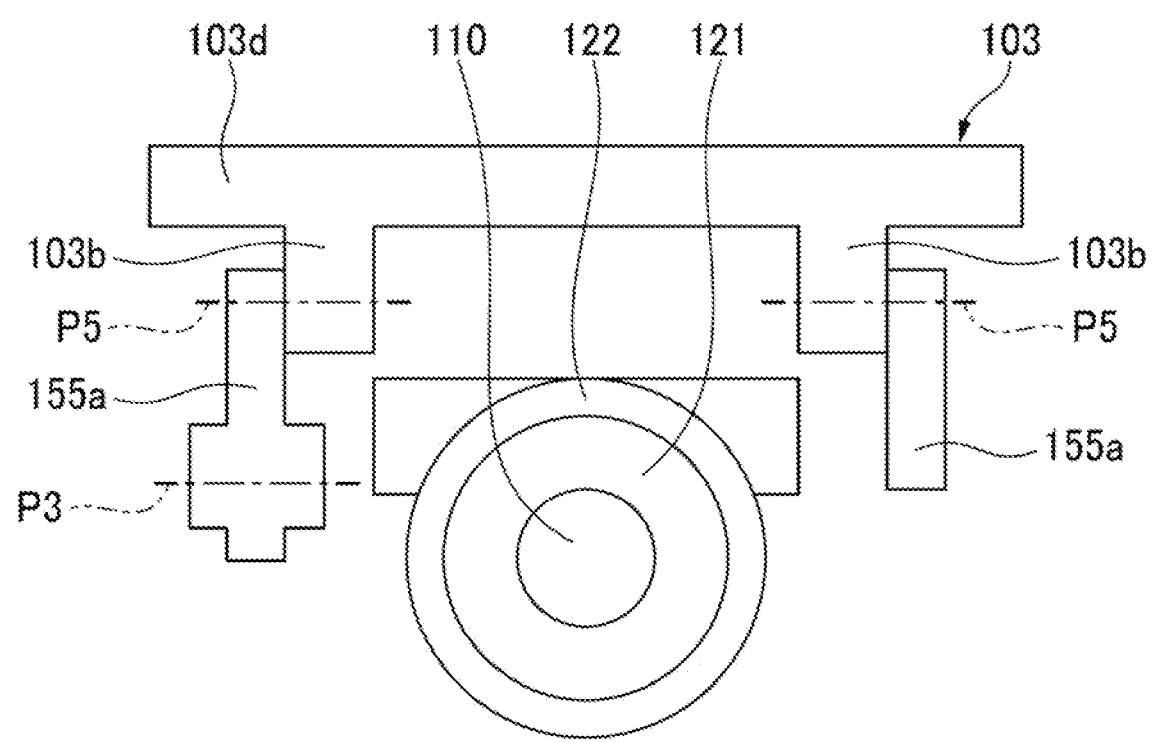
FIG. 30 is a cross-sectional arrow view taken along the line B-B in FIG. 29.
Figure 31:
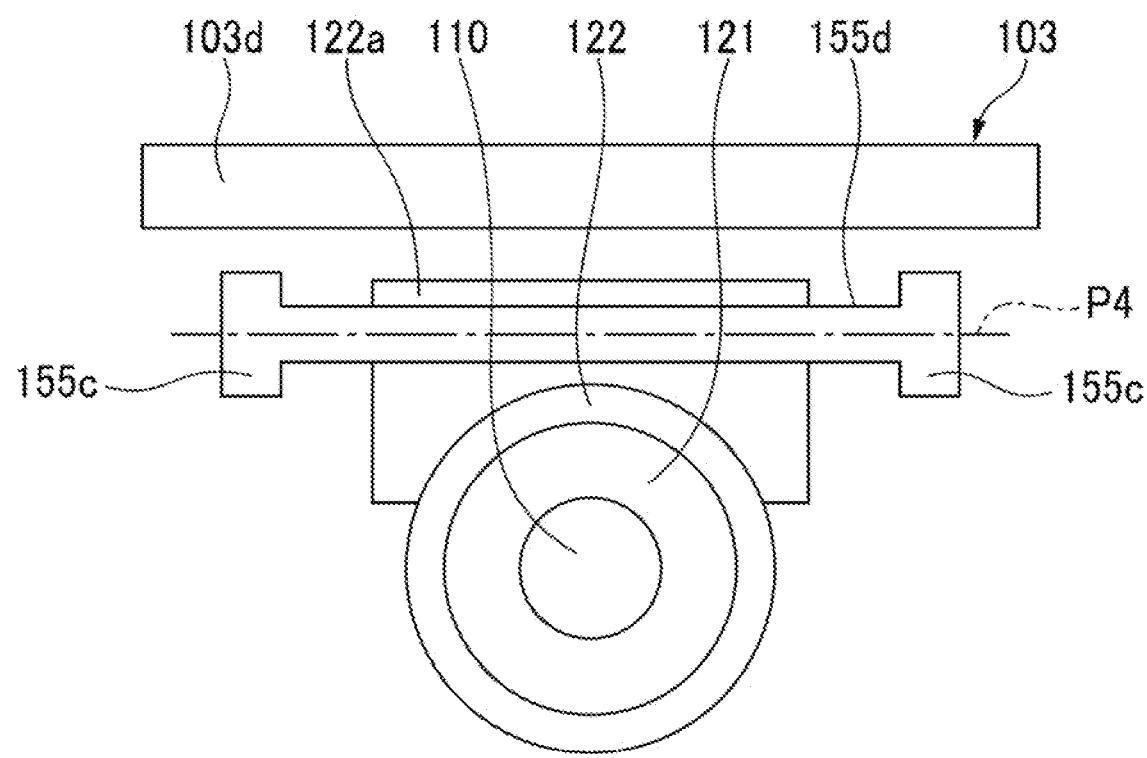
FIG. 31 is a cross-sectional arrow view taken along the line C-C in FIG. 29.

FIG. 25 is a view of the electrically adjustable steering device 1 as viewed from below. FIG. 26 is an enlarged view of a main part in FIG. 25.

FIGS. 25 and 26 illustrate central portions P2O, P3O, P4O, and P5O of the pivots P2, P3, P4, and P5 in the vehicle left-right direction. As described above, the pivots P2, P3, P4, and P5 are preferably located on a plane Q extending in the vehicle front-rear direction. That is, it is preferable that at least a part of the pivots P2, P3, P4, and P5 overlaps with the plane Q. More preferably, as shown in the illustrated example, the central portions P2O, P3O, P4O, and P5O of the pivot P2, P3, P4, and P5 are located on the plane Q.

In this way, by disposing the respective pivots P3, P4, and P5 for fixing the link member 155 on the same plane Q, the link member 155 is prevented from bending due to the moment load when tilted and the decrease in the rigidity of the link member 155 can be suppressed.

In addition to the pivots P3, P4, and P5, the pivot P2 for fixing the tilt actuator 150 is disposed on the same plane Q, whereby even when the tilt actuator 150 swings during the tilt operation, the tilt actuator 150 is prevented from bending and the rigidity of the tilt actuator 150 can be maintained.

Although not illustrated in FIGS. 25 and 26, the pivot PO (see FIG. 14) is also preferably located on the plane Q, and the central portion of the pivot PO in the vehicle left-right direction is also more preferably located on the plane Q. As described above, the pivots P0, P2, P3, P4, and P5, which contribute to the tilt operation, are preferably located on the same plane.

Further, FIG. 26 illustrates a fixed widths P2L of the tilt motor 151 by the pivot P2 and fixed widths P3L, P4L, and P5L of the link member 155 by the pivots P3, P4, and P5. As described above, each of the fixed widths P3L, P4L, and P5L is smaller than the fixed width P2L and disposed further on the inner side than the fixed width P2L. That is, the respective pivots P3, P4, and P5 are disposed inside the pivot P2 in the vehicle left-right direction. Further, the fixed widths P4L and P5L are smaller than the fixed width P3L and disposed further on the inner side than the fixed width P3L. That is, the respective pivots P4 and P5 are arranged inside the pivot P3 in the vehicle left-right direction. Therefore, even when the tilt actuator 150 swings during the tilt operation, the rigidity of the link member 155 does not decrease.

The present invention is not limited to the embodiments described above and reference examples and can be appropriately modified, improved, and the like.

1, 100: electrically adjustable steering device
101: steering wheel
103: top bracket
103a: front support portion
103b: rear support portion
103b1: connection portion
103b2: support piece
103c: rear end support portion
103d: base portion
103e: intermediate support portion
110: steering shaft
116: intermediate shaft
120: steering jacket
121: first jacket member
121a: front support portion
121b: rear support portion
122: second jacket member
122a: convex portion
122c: protrusion
122d: groove portion
123: guide member
124: wedge member
125: extension bracket
125a: end portion
125b: inverted T-shaped groove
126: bush
126a: opening
126b: slit
126s: internal space
127: lid member
128: cam member
129: pad
130: telescopic actuator
133: motor
134: screw shaft
135: nut
150: tilt actuator
151: tilt motor
152: screw shaft
153: nut
155: link member
155a: body portion
155b: connection portion
155c: pivot portion
156: first link piece
156a: support portion
156b: inclined portion
156c: base portion
156d: pivot hole
157: second link piece
157a: support portion
157b: inclined portion
157c: base portion
157d: pivot hole
157e: bolt hole
158: bolt
161, 162: universal joint
163: steering gear unit
164: pinion shaft
165: tie rod
L, L1: distance
P0, P1, P2, P3, P4, P5, P6: pivot

The invention claimed is:

1. An electrically adjustable steering device comprising:
a top bracket fixed to a vehicle body;
a steering shaft to which a steering wheel is connected;
a steering jacket which is held by the top bracket and rotatably supports the steering shaft inside;
a tilt actuator comprising a tilt motor which, by just operating the tilt motor and thereby transmitting power of the tilt actuator to the steering jacket via a link member, adjusts a tilt of the steering jacket; and
the link member which is pivotably supported by the top bracket, the steering jacket, and the tilt actuator, wherein
the link member is placed only on one side of the steering jacket in a vehicle left-right direction.

2. The electrically adjustable steering device according to claim 1, wherein
the steering jacket includes a pair of pads protruding in the vehicle left-right direction, and
the top bracket includes a pair of support portions which slidably pinch the pair of pads from an outside in the vehicle left-right direction.

3. The electrically adjustable steering device according to claim 1, wherein
the link member is pivotably fixed to the tilt actuator by a first pivot, pivotably fixed to the steering jacket or the top bracket by a second pivot, and pivotably fixed to the top bracket or the steering jacket by a third pivot, and
the first to third pivots are disposed on a same plane.

4. The electrically adjustable steering device according to claim 3, wherein
the tilt actuator includes a screw shaft, a tilt motor which rotationally drives the screw shaft, and a nut which is screwed onto the screw shaft,
the link member includes a body portion extending in a vehicle up-down direction and a pivot portion extending in an axial direction from the body portion,
the body portion includes a first part which supports the nut from the vehicle left-right direction and is fixed to the nut by the first pivot and a second part fixed to the top bracket or the steering jacket by the third pivot, and the pivot portion is fixed to the steering jacket or the top bracket by the second pivot.

5. The electrically adjustable steering device according to claim 4, wherein a part of the link member, which is the part provided with the second pivot and the third pivot, has a substantially flat plate shape.

6. The electrically adjustable steering device according to claim 3, wherein the tilt actuator is pivotably fixed to the steering jacket or the top bracket by a fourth pivot, and the first to fourth pivots are disposed on the same plane.

7. The electrically adjustable steering device according to claim 3, wherein the link member includes a body portion extending in the up-down direction and a pivot portion extending in an axial direction from the body portion, the steering jacket includes a pair of protrusions which protrude to one side in the vehicle left-right direction and are separated from each other in the vehicle up-down direction, and the second pivot is configured by pivotably supporting the pivot portion of the link member between the pair of protrusions.

8. The electrically adjustable steering device according to claim 7, wherein a bush which internally supports the pivot portion of the link member is placed between the pair of protrusions.

9. The electrically adjustable steering device according to claim 8, wherein a wedge member is disposed between the bush and the protrusion.

10. The electrically adjustable steering device according to claim 8, wherein an internal space for accommodating the pivot portion of the link member is formed inside the bush, and in the internal space, a cam member which applies a preload to the pivot portion is disposed around the pivot portion.

11. The electrically adjustable steering device according to claim 8, wherein a cover is disposed between the bush and the pair of protrusions to prevent the bush and the pair of protrusions from directly sliding.

12. An electrically adjustable steering device comprising:
a top bracket fixed to a vehicle body;
a steering shaft to which a steering wheel is connected;
a steering jacket which is held by the top bracket and rotatably supports the steering shaft inside;
a tilt actuator which, by operating a motor of the tilt actuator, directly adjusts a tilt of the steering jacket; and
a link member which is pivotably supported by the top bracket, the steering jacket, and the tilt actuator, wherein the tilt of the steering jacket can be adjusted by transmitting power of the tilt actuator to the steering jacket via the link member, and the link member is placed only on one side of the steering jacket in a vehicle left-right direction, wherein the steering jacket includes a pair of pads protruding in the vehicle left-right direction, and the top bracket includes a pair of support portions which slidably pinch the pair of pads from an outside in the vehicle left-right direction.

13. An electrically adjustable steering device comprising:
a top bracket fixed to a vehicle body;
a steering shaft to which a steering wheel is connected;
a steering jacket which is held by the top bracket and rotatably supports the steering shaft inside;
a tilt actuator which, by operating a motor of the tilt actuator, directly adjusts a tilt of the steering jacket; and
a link member which is pivotably supported by the top bracket, the steering jacket, and the tilt actuator, wherein the tilt of the steering jacket can be adjusted by transmitting power of the tilt actuator to the steering jacket via the link member, and the link member is placed only on one side of the steering jacket in a vehicle left-right direction, wherein the link member is pivotably fixed to the tilt actuator by a first pivot, pivotably fixed to the steering jacket or the top bracket by a second pivot, and pivotably fixed to the top bracket or the steering jacket by a third pivot, and the first to third pivots are disposed on a same plane.

* * * * *